United States Patent
Xin et al.

(10) Patent No.: US 11,463,918 B2
(45) Date of Patent: Oct. 4, 2022

(54) DATA PROCESSING METHOD AND APPARATUS, AND DATA SENDING METHOD AND APPARATUS

(71) Applicant: Huawei Technologies Co., Ltd., Shenzhen (CN)

(72) Inventors: Yang Xin, Shanghai (CN); Xiaobo Wu, Shanghai (CN); Weiwei Chong, Shanghai (CN); Runze Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/033,293

(22) Filed: Sep. 25, 2020

(65) Prior Publication Data

US 2021/0014739 A1 Jan. 14, 2021

Related U.S. Application Data

(63) Continuation of application No. PCT/CN2019/084816, filed on Apr. 28, 2019.

(30) Foreign Application Priority Data

May 21, 2018 (CN) .......................... 201810490222.4

(51) Int. Cl.
*H04W 28/24* (2009.01)
*H04W 76/12* (2018.01)
(Continued)

(52) U.S. Cl.
CPC .......... *H04W 28/24* (2013.01); *H04L 47/2483* (2013.01); *H04W 28/0268* (2013.01);
(Continued)

(58) Field of Classification Search
CPC ..... H04W 28/24; H04W 76/12; H04W 28/18; H04W 28/0268; H04W 28/0289; H04L 47/2483
See application file for complete search history.

(56) References Cited

U.S. PATENT DOCUMENTS 9,722,887 B2 8/2017 Kakadia et al.
2017/0317894 A1 11/2017 Dao et al.
(Continued)

FOREIGN PATENT DOCUMENTS

CN 102098651 A 6/2011
CN 105072629 A 11/2015
(Continued)

OTHER PUBLICATIONS

"3rd Generation Partnership Project; Technical Specification Group Services and System Aspects; Policy and charging control architecture (Release 15)," 3GPP TS 23.203 V15.2.0, total 261 pages, 3rd Generation Partnership Project, Valbonne, France (Mar. 2018).
(Continued)

*Primary Examiner* — Syed Ali
(74) *Attorney, Agent, or Firm* — Leydig, Voit & Mayer, Ltd.

(57) ABSTRACT

A method in the embodiments of the application includes: obtaining, by a first network element, first data that corresponds to a service flow and that is on each of at least two network elements, where the first data that corresponds to the service flow and that is on each of the network elements includes a first identifier; obtaining, by the first network element based on the first identifier and the first data that corresponds to the service flow and that is on each of the network elements, second data that corresponds to the
(Continued)

service flow, where the second data includes at least the first data that corresponds to the service flow and that is on each of the network elements.

12 Claims, 13 Drawing Sheets

(51) Int. Cl.
  *H04L 47/2483* (2022.01)
  *H04W 28/02* (2009.01)
  *H04W 28/18* (2009.01)
(52) U.S. Cl.
  CPC ....... *H04W 28/0289* (2013.01); *H04W 28/18* (2013.01); *H04W 76/12* (2018.02)

(56) References Cited

U.S. PATENT DOCUMENTS

| | | | |
|---|---|---|---|
| 2017/0332282 A1 | 11/2017 | Dao | |
| 2017/0359749 A1 | 12/2017 | Dao | |
| 2019/0191330 A1* | 6/2019 | Dao | H04W 72/0413 |
| 2019/0222489 A1* | 7/2019 | Shan | H04M 15/8022 |
| 2019/0253917 A1* | 8/2019 | Dao | H04W 28/0268 |
| 2020/0112907 A1* | 4/2020 | Dao | H04M 15/84 |
| 2021/0076250 A1* | 3/2021 | Wang | H04W 28/0221 |
| 2021/0092609 A1* | 3/2021 | Wang | H04W 12/12 |
| 2021/0153286 A1* | 5/2021 | Park | H04W 76/22 |

FOREIGN PATENT DOCUMENTS

| | | |
|---|---|---|
| CN | 107484224 A | 12/2017 |
| RU | 2016136580 A | 3/2018 |
| WO | 2015120601 A1 | 8/2015 |

OTHER PUBLICATIONS

"3rd Generation Partnership Project; Technical Specification Group Services and System Aspects; System Architecture for the 5G System; Stage 2 (Release 15)," 3GPP TS 23.501 V15.1.0, total 201 pages, 3rd Generation Partnership Project, Valbonne, France (Mar. 2018).

"3rd Generation Partnership Project; Technical Specification Group Services and System Aspects; Procedures for the 5G System; Stage 2 (Release 15)," 3GPP TS 23.502 V15.1.0, total 285 pages, 3rd Generation Partnership Project, Valbonne, France (Mar. 2018).

"3rd Generation Partnership Project; Technical Specification Group Services and System Aspects; Policy and Charging Control Framework for the 5G System; Stage 2 (Release 15)," 3GPP TS 23.503 V15.1.0, total 65 pages, 3rd Generation Partnership Project, Valbonne, France (Mar. 2018).

"3rd Generation Partnership Project; Technical Specification Group Services and System Aspects; Architecture enhancements to facilitate communications with packet data networks and applications (Release 15)," 3GPP TS 23.682 V15.4.0, total 124 pages, 3rd Generation Partnership Project, Valbonne, France (Mar. 2018).

"3rd Generation Partnership Project; Technical Specification Group Services and System Aspects; Study of Enablers or Network Automation for 5G (Release 16)," 3GPP TR 23.791 V0.3.0, total 19 pages, 3rd Generation Partnership Project, Valbonne, France (Apr. 2018).

"3rd Generation Partnership Project; Technical Specification Group Radio Access Network; NG-RAN; NG Application Protocol (NGAP) (Release 15)," 3GPP TS 38.413 V0.8.0, total 164 pages, 3rd Generation Partnership Project, Valbonne, France (Apr. 2018).

"Solution for Key Issue 5: NWDAF-Assisted QoS Profile Provisioning," SA WG2 Meeting #127, S2-185706, Sanya, China, total 5 pages, 3rd Generation Partnership Project, Valbonne, France (Apr. 16-20, 2018).

"Use Case: NWDA-assisting E2E QoS Assurance," SA WG2 Meeting #127, Sanya, China, S2-183634, total 4 pages, 3rd Generation Partnership Project, Valbonne, France (Apr. 16-20, 2018).

"Solution for QoS Provisioning and Adjustment," Sa WG2 Meeting #127, Sanya, China, S2-183635, total 5 pages, 3rd Generation Partnership Project, Valbonne, France (Apr. 16-20, 2018).

"Use Case: NWDA-assisting E2E QoS Assurance," SA WG2 Meeting #127, Sanya, China, S2-183941, total 4 pages, 3rd Generation Partnership Project, Valbonne, France (Apr. 16-20, 2018).

"Use Case: NWDA-assisting E2E QoS Assurance," SA WG2 Meeting #127, Sanya, China, S2-184632, total 4 pages, 3rd Generation Partnership Project, Valbonne, France (Apr. 16-20, 2018).

"Solution for Key Issue 5: NWDAF-Assisted QoS Profile Provisioning," SA WG2 Meeting #127, Sanya, China, S2-185177, total 6 pages, 3rd Generation Partnership Project, Valbonne, France (Apr. 16-20, 2018).

"Solution for Key Issue 5: NWDAF-Assisted QoS Profile Provisioning," SA WG2 Meeting #127, Sanya, China, S2-185818, total 6 pages, 3rd Generation Partnership Project, Valbonne, France (Apr. 16-20, 2018).

"Solution for Key Issue 5: NWDAF-Assisted QoS Profile Provisioning," SA WG2 Meeting #127, S2-186272, Sanya, China, total 6 pages, 3rd Generation Partnership Project, Valbonne, France (Apr. 16-20, 2018).

RU/2020135511, Office Action/Search Report, dated Jul. 1, 2022.

* cited by examiner

DATA PROCESSING METHOD AND APPARATUS, AND DATA SENDING METHOD AND APPARATUS

CROSS-REFERENCE TO RELATED APPLICATION

This application is a continuation of International Application No. PCT/CN2019/084816, filed on Apr. 28, 2019, which claims priority to Chinese Patent Application No. 201810490222.4, filed on May 21, 2018. The disclosures of the aforementioned applications are hereby incorporated by reference in their entireties.

TECHNICAL FIELD

Embodiments of this application relate to the field of communications technologies, and in particular, to a data processing method and apparatus, and a data sending method and apparatus.

BACKGROUND

In 3GPP release 15 (R15), a policy control function (PCF) network element on a core network side generates a set of quality of service (QoS) parameters for a service, but network data and service data change over time, leading to a change in service experience. Therefore, only one set of QoS parameters cannot satisfy constantly changing network environments (corresponding to the network data) and service requirements (corresponding to the service data). As shown in FIG. 1, a service starts from a first time T1 (a timestamp 0000) and ends at a second time T2 (a timestamp 0012). In a time period (for example, 12 seconds) between T2 and T1, a mean opinion score (MOS) is calculated every one second.

It can be learned from FIG. 1 that root causes of a difference in voice MOSs corresponding to different time points lie in a network status and time variation (which means that network data and service data change over time) of some service parameters. For example, the service parameters may be: radio channel quality, bandwidth, latency, a packet loss rate, a jitter buffer, a transmission control protocol (TCP) congestion window, a TCP receive window, or the like on a terminal; radio channel quality, bandwidth, latency, a packet loss rate, a congestion level, or the like on an air interface of an access network; user plane bandwidth, user plane load information, or the like on a core network side; and a TCP congestion window, a TCP receive window, a media encoding type, an encoding rate, or the like on a service layer. These time variation parameters on the terminal, the access network, the core network, and the service layer affect service experience.

In a 5G system, a service of a terminal is carried on a service flow. The service flow may be a quality of service flow, that is, a QoS flow, or may be a service data flow, that is, a service data flow. Therefore, a change in service experience is actually an experience change specific to a service flow, and corresponds to a change in parameters on a terminal, an access network, a core network, or a service layer. Therefore, how to obtain parameters distributed on different network elements based on service flow levels is a technical problem that urgently needs to be resolved currently.

SUMMARY

Embodiments of this application provide a data processing method and apparatus, and a data sending method and apparatus, to obtain data that is of a service flow and that is distributed on different network elements.

To achieve the foregoing objective, the following technical solutions are used in the embodiments of this application:

According to a first aspect, an embodiment of this application provides a data processing method, including: obtaining, by a first network element, first data that corresponds to a service flow and that is on each of at least two network elements, where the first data that corresponds to the service flow and that is on each of the network elements includes a first identifier; and obtaining, by the first network element based on the first identifier and the first data that corresponds to the service flow and that is on each of the network elements, second data that corresponds to the service flow, where the second data includes at least the first data that corresponds to the service flow and that is on each of the network elements, or the second data includes at least a part of the first data that corresponds to the service flow and that is on each of the network elements.

This embodiment of this application provides a data processing method. The first network element obtains first data that is of a service flow and that is on different network elements, and correlates the first data that is of the service flow and that is on the different network elements based on first identifiers in the first data sent from the different network elements, to obtain second data. In this way, the first network element can subsequently plan one or more sets of QoS parameters of a service to which the service flow belongs, a user plane path corresponding to a session to which the service flow belongs, slice resource optimization, control-plane or user-plane abnormality detection, and the like.

With reference to the first aspect, in a first possible implementation of the first aspect, the method provided in the embodiment of this application further includes: receiving, by the first network element, a first message that is sent from a second network element and that is used to instruct the first network element to obtain, from the at least two network elements, the first data corresponding to the service flow. The first message includes one or more of the following information: an identifier of a service to which the service flow belongs, a terminal type of a terminal corresponding to the service flow, a network area in which the terminal corresponding to the service flow is located, and a time window corresponding to the service flow. A requirement is sent to the first network element by using the first message, so that the first network element can determine that first data that corresponds to the service flow and that is on different network elements needs to be obtained from the different network elements. Because the first message further carries the time window corresponding to the service flow, the first network element can obtain corresponding data that changes over time on the different network elements.

With reference to the first aspect or the first possible implementation of the first aspect, in a second possible implementation of the first aspect, the method provided in this embodiment of this application further includes: sending, by the first network element, a first request to each of the at least two network elements, where the first request is used to request the first data that corresponds to the service flow and that is on each of the network elements, and the first request includes one or more of the following information: the identifier of the service to which the service flow belongs, the terminal type of the terminal corresponding to the service flow, the network area in which the terminal corresponding to the service flow is located, and the time window corresponding to the service flow. In this way, after receiving the first request, each network element learns of a requirement of the first network element, to feed back the first data that corresponds to the service flow, that is on the network element, and that satisfies the requirement of the first network element.

With reference to any one of the first aspect, or the first or the second possible implementation of the first aspect, in a third possible implementation of the first aspect, the obtaining, by a first network element, first data that corresponds to a service flow and that is on each of at least two network elements includes: receiving, by the first network element, a second message that is sent from each of the network elements and includes the first data that corresponds to the service flow and that is on each of the network elements.

With reference to any one of the first aspect, or the first to the third possible implementations of the first aspect, in a fourth possible implementation of the first aspect, the first data further includes one or more of the following information: an identifier of a network element to which the first data corresponding to the service flow belongs, an identifier of the terminal, and a data value of at least one data type of at least one of the at least two network elements. In this way, information included by the first data is more diversified.

For example, the identifier of the terminal in this embodiment of this application may be one or more of the following: an internet protocol (IP) address, a subscription permanent identifier (SUPI), a permanent equipment identifier (PEI), a generic public subscription identifier (GPSI), an international mobile subscriber identity (IMSI), an international mobile equipment identity ( ) an IP 5-tuple (5-tuple), and a mobile station international ISDN number (MSISDN). For an identifier of a terminal in the following embodiments, refer to the description herein. Details are not described again subsequently.

With reference to any one of the first aspect, or the first to the fourth possible implementations of the first aspect, in a fifth possible implementation of the first aspect, the at least two network elements include a third network element. When the third network element is an application function AF network element, first data obtained from the third network element further includes one or more of the following information: the identifier of the service to which the service flow belongs, a communication pattern parameter of the service to which the service flow belongs, flow bit rate data of a first interface, latency data of the first interface, packet loss rate data of the first interface, packet data of the first interface, a timestamp, experience data of the service to which the service flow belongs, jitter buffer data, transmission control protocol TCP congestion window data, TCP receive window data, media encoding type data, encoding rate data of the media encoding type data, and buffer data, where the first interface is an interface between a user plane function UPF network element and a data network DN that corresponds to the AF network element; when the third network element is a policy control function PCF network element, first data obtained from the third network element further includes one or more of the following information: the identifier of the service to which the service flow belongs, an identifier of a session to which the service flow belongs, a data network name DNN of the session to which the service flow belongs, identification information of a slice to which the service flow belongs, IP filtering information, a media bandwidth requirement, traffic routing information, a jitter buffer requirement, a TCP congestion window requirement, a TCP receive window requirement, a media encoding type requirement, an encoding rate requirement in the media encoding type requirement, a validity time window of the identifier of the service, and a radio access technology type; when the third network element is a session management function SMF network element, first data obtained from the third network element further includes one or more of the following information: an identifier of the service flow, an identifier of a session to which the service flow belongs, a DNN of the session to which the service flow belongs, identification information of a slice to which the service flow belongs, a validity time window of the identifier of the service flow, and a radio access technology type; when the third network element is a first UPF network element, first data obtained from the third network element further includes one or more of the following information: an identifier of the service flow, a timestamp, flow bit rate data of a second interface, flow bit rate data of a first interface, bit rate data of a third interface, latency data of the second interface, latency data of the first interface, latency data of the third interface, packet loss rate data of the first interface, packet loss rate data of the second interface, packet loss rate data of the third interface, packet data of the first interface, packet data of the second interface, and packet data of the third interface, where the second interface is an interface between the first UPF network element and a radio access network RAN device, and the third interface is an interface between the first UPF network element and a second UPF network element; when the third network element is an access and mobility management AMF network element, first data obtained from the third network element further includes at least one of the following information: location information of the terminal corresponding to the service flow, an identifier of a session to which the service flow belongs, a DNN of the session to which the service flow belongs, identification information of a slice to which the service flow belongs, a validity time window of the identifier of the session to which the service flow belongs, and a radio access technology type; when the network element is a RAN device, first data obtained from the third network element further includes one or more of the following information: location information of the terminal corresponding to the service flow, an identifier of the service flow, an identifier of a session to which the service flow belongs, identification information of a slice to which the service flow belongs, a timestamp, flow bit rate data of a fourth interface, flow bit rate data of a second interface, latency data of the second interface, latency data of the fourth interface, reference signal received power RSRP data, reference signal received quality RSRQ data, signal to interference plus noise ratio SINR data, channel quality information CQI data, block error rate BLER data, packet rate data, packet data of the second interface, packet data of the fourth interface, a radio access technology type, and dual connectivity indication information, where the fourth interface is an interface between the RAN device and the terminal; or when the third network element is a terminal, first data obtained from the third network element further includes one or more of the following information: location information of the terminal corresponding to the service flow, an identifier of the service flow, an identifier of a session to which the service flow belongs, a DNN of the session to which the service flow belongs, identification information of a slice to which the service flow belongs, flow bit rate data of a fourth interface, latency data of the fourth interface, packet loss rate data of the fourth interface, packet data of the fourth interface, a timestamp, CPU usage data, memory usage data, service experience data, jitter buffer data, TCP congestion window data, TCP receive window data, media encoding type data, encoding rate data of the media encoding type data, reference signal received power RSRP data, reference signal received quality RSRQ data, signal to interference plus noise ratio SINR data, channel quality information CQI data, block error rate BLER data, and buffer data. In this way, first data fed back by different network elements is more diversified.

For example, the identification information of the slice may be one or more of the following information: single network slice selection assistance information (S-NSSAI) and a network slice instance (NSI) ID, where the S-NSSAI includes a slice type and a Tenant ID. For identification information of a slice in the following embodiments, refer to the description herein. Details are not described again subsequently.

For example, the location information of the terminal in this embodiment of this application may be one or more of the following information: a RAN device ID, a cell ID, and a global positioning system (GPS). For location information of a terminal in the following embodiments, refer to the description herein. Details are not described again subsequently.

With reference to any one of the first aspect, or the first to the fifth possible implementations of the first aspect, in a sixth possible implementation of the first aspect, the first identifier included in the first data that corresponds to the service flow and that is on each of the network elements is one or more of the following information: the identifier of the service to which the service flow belongs, the identifier of the service flow, the identifier of the terminal, the identifier of the session to which the service flow belongs, the DNN of the session to which the service flow belongs, the identification information of the slice to which the service flow belongs. Due to diversification of the first identifier, the first network element can determine, based on the first identifier, first data that corresponds to a same service flow and that is on different network elements.

With reference to any one of the first aspect, or the first to the sixth possible implementations of the first aspect, in a seventh possible implementation of the first aspect, the first data that corresponds to the service flow and that is each of on the network elements includes a same first identifier.

With reference to any one of the first aspect, or the first to the seventh possible implementations of the first aspect, in an eighth possible implementation of the first aspect, the method provided in this embodiment of the present disclosure further includes: receiving, by the first network element, a third request sent from a fourth network element, where the third request is used to request to allocate the first identifier to the service flow; and sending, by the first network element, a third response to the third network element, where the third response includes the first identifier.

With reference to any one of the first aspect, or the first to the eighth possible implementations of the first aspect, in a ninth possible implementation of the first aspect, the service flow is a quality of service flow or a service data flow.

With reference to any one of the first aspect, or the first to the ninth possible implementations of the first aspect, in a tenth possible implementation of the first aspect, the obtaining, by a first network element, first data that corresponds to a service flow and that is on each of at least two network elements includes: receiving, by the first network element, first data that is sent from an operation, administration and maintenance network element, that corresponds to the service flow and that is on each of the at least two network elements.

According to a second aspect, an embodiment of this application provides a data processing method, where the method includes: determining, by a network element, that a first identifier of a service flow is obtained, where the first identifier is used to identify first data that is of the service flow and that is on the network element; and sending, by the network element, the first data to a first network element, where the first data is used by the first network element to obtain second data, the second data includes the first data or the second data includes a part of the first data, and the first data carries the first identifier.

With reference to the second aspect, in a first possible implementation of the second aspect, the method provided in this embodiment of this application includes: receiving, by the network element, a first request sent from the first network element, where the first request is used to request the first data that corresponds to the service flow and that is on the network element, and the first request includes one or more of the following information: an identifier of a service to which the service flow belongs, a terminal type of a terminal corresponding to the service flow, a network area corresponding to the terminal when the terminal uses the service flow, and a time window corresponding to the service flow.

With reference to the second aspect or the first possible implementation of the second aspect, in a second possible implementation of the second aspect, the first data further includes one or more of the following information: an identifier of the network element to which the first data corresponding to the service flow belongs, an identifier of the terminal, and a data value of at least one data type of at least one of two or more network elements.

With reference to any one of the second aspect, or the first or the second possible implementation of the second aspect, in a third possible implementation of the second aspect, a data value of a data type of the network element includes: determining, by the network element, a second data value based on a first data value of a first data type of the network element, where the first data value belongs to a first value space, the second data value belongs to a second value space, and the first data type is any entry in the first data.

With reference to any one of the second aspect, or the first to the third possible implementations of the second aspect, in a fourth possible implementation of the second aspect, the data value of the data type of the network element further includes: determining, by the network element, a fourth data value based on a third data value of a second data type of the network element, where the third data value belongs to a third value space, the fourth data value belongs to a fourth value space, and the second data type is any entry in the first data.

With reference to any one of the second aspect, or the first to the fourth possible implementations of the second aspect, in a fifth possible implementation of the second aspect, the second value space is the same as the fourth value space.

With reference to the second aspect, or the first to the fifth possible implementations of the second aspect, in a sixth possible implementation of the second aspect, when the network element is an application function AF network element, the first data further includes one or more of the following information: the identifier of the service to which the service flow belongs, a communication pattern parameter of the service to which the service flow belongs, flow bit rate data of a first interface, latency data of the first interface, packet loss rate data of the first interface, packet data of the first interface, a timestamp, experience data of the service to which the service flow belongs, jitter buffer data, transmission control protocol TCP congestion window data, TCP receive window data, media encoding type data, encoding rate data of the media encoding type data, and buffer data, where the first interface is an interface between a UPF network element and a data network DN that corresponds to the AF network element; when the network element is a policy control function PCF network element, the first data further includes one or more of the following information: the identifier of the service to which the service flow belongs, an identifier of a session to which the service flow belongs, a data network name DNN of the session to which the service flow belongs, identification information of a slice to which the service flow belongs, IP filtering information, a media bandwidth requirement, traffic routing information, a jitter buffer requirement, a TCP congestion window requirement, a TCP receive window requirement, a media encoding type requirement, an encoding rate requirement in the media encoding type requirement, a validity time window of the identifier of the service, and a radio access technology type; when the network element is a session management function SMF network element, the first data further includes one or more of the following information: an identifier of the service flow, an identifier of a session to which the service flow belongs, a DNN of the session to which the service flow belongs, identification information of a slice to which the service flow belongs, a validity time window of the identifier of the service flow, and a radio access technology type; when the network element is a first UPF network element, the first data further includes one or more of the following information: an identifier of the service flow, a timestamp, flow bit rate data of a second interface, flow bit rate data of a first interface, bit rate data of a third interface, latency data of the second interface, latency data of the first interface, latency data of the third interface, packet loss rate data of the first interface, packet loss rate data of the second interface, packet loss rate data of the third interface, packet data of the first interface, packet data of the second interface, and packet data of the third interface, where the second interface is an interface between the first UPF network element and a radio access network RAN device, and the third interface is an interface between the first UPF network element and a second UPF network element; when the network element is an access and mobility management AMF network element, the first data further includes at least one of the following information: location information of the terminal corresponding to the service flow, an identifier of a session to which the service flow belongs, a DNN of the session to which the service flow belongs, identification information of a slice to which the service flow belongs, a validity time window of the identifier of the session to which the service flow belongs, and a radio access technology type; when the network element is a RAN device, the first data further includes one or more of the following information: location information of the terminal corresponding to the service flow, an identifier of the service flow, an identifier of a session to which the service flow belongs, identification information of a slice to which the service flow belongs, a timestamp, flow bit rate data of a fourth interface, flow bit rate data of a second interface, latency data of the second interface, latency data of the fourth interface, reference signal received power RSRP data, reference signal received quality RSRQ data, signal to interference plus noise ratio SINR data, channel quality information CQI data, block error rate BLER data, packet loss rate data of the second interface, packet loss rate data of the fourth interface, packet data of the second interface, packet data of the fourth interface, a radio access technology type, and dual connectivity indication information, where the fourth interface is an interface between the RAN device and the terminal; or when the network element is a terminal, the first data further includes one or more of the following information: location information of the terminal that uses the service flow, an identifier of the service flow, an identifier of a session to which the service flow belongs, a DNN of the session to which the service flow belongs, identification information of a slice to which the service flow belongs, flow bit rate data of a fourth interface, latency data of the fourth interface, packet loss rate data of the fourth interface, packet data of the fourth interface, a timestamp, processor CPU usage data, memory usage data, service experience data, jitter buffer data, transmission control protocol TCP congestion window data, TCP receive window data, media encoding type data, encoding rate data of the media encoding type data, reference signal received power RSRP data, reference signal received quality RSRQ data, signal to interference plus noise ratio SINR data, channel quality information CQI data, block error rate BLER data, and buffer data.

With reference to the second aspect, or the first to the sixth possible implementations of the second aspect, in a seventh possible implementation of the second aspect, when the network element is a policy control network element, the method provided in this embodiment of this application further includes: receiving, by the network element, a second request sent from an application function AF network element, where the second request is used to request to establish the service flow, and the second request includes one or more of the following information: the identifier of the service to which the service flow belongs, IP filtering information, a media bandwidth requirement, traffic routing information, a jitter buffer requirement, a TCP congestion window requirement, a TCP receive window requirement, a media encoding type requirement, an encoding rate requirement in the media encoding type requirement, a buffer requirement, and a requirement for at least one data type.

With reference to the second aspect, or the first to the seventh possible implementations of the second aspect, in an eighth possible implementation of the second aspect, the first identifier is one or more of the following information: the identifier of the service to which the service flow belongs, the identifier of the service flow, the identifier of the terminal, the identifier of the session to which the service flow belongs, the DNN of the session to which the service flow belongs, the identification information of the slice to which the service flow belongs.

With reference to any one of the second aspect, or the first to the eighth possible implementations of the second aspect, in a ninth possible implementation of the second aspect, the service flow is a quality of service flow or a service data flow.

With reference to any one of the second aspect, or the first to the ninth possible implementations of the second aspect, in a tenth possible implementation of the second aspect, the network element sends a first message to the first network element, where the first message is used to instruct the first network element to obtain, from at least two network elements, the first data corresponding to the service flow, and the first message includes one or more of the following information: the identifier of the service to which the service flow belongs, the terminal type of the terminal corresponding to the service flow, the network area in which the terminal corresponding to the service flow is located, and the time window corresponding to the service flow.

With reference to any one of the second aspect, or the first to the tenth possible implementations of the second aspect, in an eleventh possible implementation of the second aspect, the data value of the data type of the network element further includes: determining, by the network element, a sixth data value based on a fifth data value of a third data type of the network element, where the fifth data value belongs to a fifth value space, the sixth data value belongs to a sixth value space, and the third data type is any entry in the first data.

With reference to any one of the second aspect, or the first to the eleventh possible implementations of the second aspect, in a twelfth possible implementation of the second aspect, every two of the second value space, the fourth value space, and the sixth value space are the same.

With reference to any one of the second aspect, or the first to the twelfth possible implementations of the second aspect, in a thirteenth possible implementation of the second aspect, a sending unit is configured to send the first data to an operation, administration and maintenance network element.

According to a third aspect, an embodiment of this application provides a data sending method, where the method includes: sending, by a network element to a first network element, a first message used to instruct the first network element to obtain, from at least two network elements, first data corresponding to a service flow, and the first message includes one or more of the following information: an identifier of a service to which the service flow belongs, a terminal type of a terminal corresponding to the service flow, a network area in which the terminal corresponding to the service flow is located, and a time window corresponding to the service flow.

According to a fourth aspect, this application provides a data processing apparatus. The data processing apparatus may implement the method in the first aspect or any possible implementation of the first aspect, and therefore can achieve beneficial effects in the first aspect or any possible implementation of the first aspect. The data processing apparatus may be a first network element, or may be an apparatus that can support a first network element in implementing the method in the first aspect or any possible implementation of the first aspect, for example, a chip applied to the first network element. The apparatus may implement the foregoing method by using software or hardware, or by hardware executing corresponding software.

In a possible design, an embodiment of this application provides a data processing apparatus. The data processing apparatus may be a first network element or a chip applied to a first network element. The data processing apparatus includes: an obtaining unit, configured to obtain first data that corresponds to a service flow and that is on each of at least two network elements, where the first data that corresponds to the service flow and that is on each of the network elements includes a first identifier; and a processing unit, configured to obtain, based on the first identifier and the first data that corresponds to the service flow and that is on each of the network elements, second data that corresponds to the service flow, where the second data includes at least the first data that corresponds to the service flow and that is on each of the network elements, or the second data includes at least a part of the first data that corresponds to the service flow and that is on each of the network elements.

With reference to the fourth aspect, in a first possible implementation of the fourth aspect, the apparatus provided by this embodiment of this application further includes: a receiving unit, configured to receive a first message sent from a second network element, where the first message is used to instruct the first network element to obtain, from the at least two network elements, the first data corresponding to the service flow, and the first message includes one or more of the following information: an identifier of a service to which the service flow belongs, a terminal type of a terminal corresponding to the service flow, a network area in which the terminal corresponding to the service flow is located, and a time window corresponding to the service flow.

With reference to the fourth aspect or the first possible implementation of the fourth aspect, in a second possible implementation of the fourth aspect, the apparatus provided by this embodiment of this application further includes: a sending unit, configured to send a first request to each of the at least two network elements, where the first request is used to request the first data that corresponds to the service flow and that is on each of the network elements, and the first request includes one or more of the following information: the identifier of the service to which the service flow belongs, the terminal type of the terminal corresponding to the service flow, the network area in which the terminal corresponding to the service flow is located, and the time window corresponding to the service flow.

With reference to any one of the fourth aspect, or the first or the second possible implementation of the fourth aspect, in a third possible implementation of the fourth aspect, the receiving unit is further configured to receive a second message sent from each of the network elements, where the second message includes the first data that corresponds to the service flow and that is on the respective network elements; and the obtaining unit is specifically configured to obtain, from the second message sent from each of the network elements, the first data that corresponds to the service flow and that is on the respective network elements.

With reference to any one of the fourth aspect, or the first to the third possible implementations of the fourth aspect, in a fourth possible implementation of the fourth aspect, the first data further includes one or more of the following information: an identifier of a network element to which the first data corresponding to the service flow belongs, an identifier of the terminal, and a data value of at least one data type of at least one of the at least two network elements.

With reference to any one of the fourth aspect, or the first to the fourth possible implementations of the fourth aspect, in a fifth possible implementation of the fourth aspect, the at least two network elements include a third network element. When the third network element is an application function AF network element, first data obtained from the third network element further includes one or more of the following information: the identifier of the service to which the service flow belongs, a communication pattern parameter of the service to which the service flow belongs, flow bit rate data of a first interface, latency data of the first interface, packet loss rate data of the first interface, packet data of the first interface, a timestamp, experience data of the service to which the service flow belongs, jitter buffer data, transmission control protocol TCP congestion window data, TCP receive window data, media encoding type data, encoding rate data of the media encoding type data, and buffer data, where the first interface is an interface between a user plane function UPF network element and a data network DN that corresponds to the AF network element; when the third network element is a policy control function PCF network element, first data obtained from the third network element further includes one or more of the following information: the identifier of the service to which the service flow belongs, an identifier of a session to which the service flow belongs, a data network name DNN of the session to which the service flow belongs, identification information of a slice to which the service flow belongs, IP filtering information, a media bandwidth requirement, traffic routing information, a jitter buffer requirement, a TCP congestion window requirement, a TCP receive window requirement, a media encoding type requirement, an encoding rate requirement in the media encoding type requirement, a validity time window of the identifier of the service, and a radio access technology type; when the third network element is a session management function SMF network element, first data obtained from the third network element further includes one or more of the following information: an identifier of the service flow, an identifier of a session to which the service flow belongs, a DNN of the session to which the service flow belongs, identification information of a slice to which the service flow belongs, a validity time window of the identifier of the service flow, and a radio access technology type; when the third network element is a first UPF network element, first data obtained from the third network element further includes one or more of the following information: an identifier of the service flow, a timestamp, flow bit rate data of a second interface, flow bit rate data of a first interface, bit rate data of a third interface, latency data of the second interface, latency data of the first interface, latency data of the third interface, packet loss rate data of the first interface, packet loss rate data of the second interface, packet loss rate data of the third interface, packet data of the first interface, packet data of the second interface, and packet data of the third interface, where the second interface is an interface between the first UPF network element and a radio access network RAN device, and the third interface is an interface between the first UPF network element and a second UPF network element; when the third network element is an access and mobility management AMF network element, first data obtained from the third network element further includes at least one of the following information: location information of the terminal corresponding to the service flow, an identifier of a session to which the service flow belongs, a DNN of the session to which the service flow belongs, identification information of a slice to which the service flow belongs, a validity time window of the identifier of the session to which the service flow belongs, and a radio access technology type; when the third network element is a RAN device, first data obtained from the third network element further includes one or more of the following information: location information of the terminal corresponding to the service flow, an identifier of the service flow, an identifier of a session to which the service flow belongs, identification information of a slice to which the service flow belongs, a timestamp, flow bit rate data of a fourth interface, flow bit rate data of a second interface, latency data of the second interface, latency data of the fourth interface, reference signal received power RSRP data, reference signal received quality RSRQ data, signal to interference plus noise ratio SINR data, channel quality information CQI data, block error rate BLER data, packet loss rate data of the second interface, packet loss rate data of the fourth interface, packet data of the second interface, packet data of the fourth interface, a radio access technology type, and dual connectivity indication information, where the fourth interface is an interface between the RAN device and the terminal; or when the third network element is a terminal, first data obtained from the third network element further includes one or more of the following information: location information of the terminal corresponding to the service flow, an identifier of the service flow, an identifier of a session to which the service flow belongs, a DNN of the session to which the service flow belongs, identification information of a slice to which the service flow belongs, flow bit rate data of a fourth interface, latency data of the fourth interface, packet loss rate data of the fourth interface, packet data of the fourth interface, a timestamp, processor CPU usage data, memory usage data, service experience data, jitter buffer data, TCP congestion window data, TCP receive window data, media encoding type data, encoding rate data of the media encoding type data, reference signal received power RSRP data, reference signal received quality RSRQ data, signal to interference plus noise ratio SINR data, channel quality information CQI data, block error rate BLER data, and buffer data.

With reference to any one of the fourth aspect, or the first to the fifth possible implementations of the fourth aspect, in a sixth possible implementation of the fourth aspect, the first identifier included in the first data that corresponds to the service flow and that is on each of the network elements is one or more of the following information: the identifier of the service to which the service flow belongs, the identifier of the service flow, the identifier of the terminal, the identifier of the session to which the service flow belongs, the DNN of the session to which the service flow belongs, the identification information of the slice to which the service flow belongs.

With reference to any one of the fourth aspect, or the first to the sixth possible implementations of the fourth aspect, in a seventh possible implementation of the fourth aspect, the first data that corresponds to the service flow and that is on each of the network elements includes a same first identifier.

With reference to any one of the fourth aspect, or the first to the seventh possible implementations of the fourth aspect, in an eighth possible implementation of the fourth aspect, the receiving unit is further configured to receive a third request sent from a fourth network element, where the third request is used to request to allocate the first identifier to the service flow; and a sending unit, configured to send a third response to the third network element, where the third response includes the first identifier.

With reference to any one of the fourth aspect, or the first to the eighth possible implementations of the fourth aspect, in a ninth possible implementation of the fourth aspect, the service flow is a quality of service flow or a service data flow.

With reference to any one of the fourth aspect, or the first to the ninth possible implementations of the fourth aspect, in a tenth possible implementation of the fourth aspect, the receiving unit is further configured to receive first data that is sent from an operation, administration and maintenance network element, that corresponds to the service flow and that is on each of the at least two network elements.

In another possible design, an embodiment of this application further provides a data processing apparatus. The data processing apparatus may be a first network element or a chip applied to a first network element. The apparatus includes a processor and a communications interface. The communications interface is configured to support the apparatus in performing a message/data receiving and sending steps on the apparatus side in any one of the first aspect or the possible implementations of the first aspect. The processor is configured to support the apparatus in performing a message/data processing step on the apparatus side in any one of the first aspect or the possible implementations of the first aspect. For a specific corresponding step, refer to the description in any one of the first aspect or the possible implementations of the first aspect. Details are not described in this embodiment of this application again.

Optionally, the communications interface and the processor of the data processing apparatus are coupled to each other.

Optionally, the data processing apparatus may further include a memory, configured to store code and data. The processor, the communications interface, and the memory are coupled to each other.

According to a fifth aspect, this application provides a data sending apparatus. The data sending apparatus may implement the method in the second aspect or any possible implementation of the second aspect, and therefore can achieve beneficial effects in the second aspect or any possible implementation of the second aspect. The data sending apparatus may be a network element, or may be an apparatus that can support a network element in implementing the method in the second aspect or any possible implementation of the second aspect, for example, a chip applied to the network element. The apparatus may implement the foregoing method by using software or hardware, or by hardware executing corresponding software.

In a possible design, an embodiment of this application provides a data sending apparatus. The data sending apparatus may be a network element or a chip applied to a network element. The data sending apparatus includes: a determining unit, configured to determine that a first identifier of a service flow is obtained, where the first identifier is used to identify first data that is of the service flow and that is on the network element; and a sending unit, configured to send first data to a first network element, where the first data is used by the first network element to obtain second data, the second data includes the first data or the second data includes a part of the first data, and the first data carries the first identifier.

With reference to the fifth aspect, in a first possible implementation of the fifth aspect, the apparatus includes a receiving unit, configured to receive a first request sent from the first network element, where the first request is used to request the first data that corresponds to the service flow and that is on the network element, and the first request includes one or more of the following information: an identifier of a service to which the service flow belongs, a terminal type of a terminal corresponding to the service flow, a network area corresponding to the terminal when the terminal uses the service flow, and a time window corresponding to the service flow.

With reference to the fifth aspect or the first possible implementation of the fifth aspect, in a second possible implementation of the fifth aspect, the first data further includes one or more of the following information: an identifier of the network element to which the first data corresponding to the service flow belongs, an identifier of the terminal, and a data value of at least one data type of at least one of two or more network elements.

With reference to any one of the fifth aspect, or the first or the second possible implementation of the fifth aspect, in a third possible implementation of the fifth aspect, a data value of a data type of the network element specifically includes: determining, by the determining unit, a second data value based on a first data value of a first data type of the apparatus, where the first data value belongs to a first value space, the second data value belongs to a second value space, and the first data type is any entry in the first data.

With reference to any one of the fifth aspect, or the first to the third possible implementations of the fifth aspect, in a fourth possible implementation of the fifth aspect, the data value of the data type of the network element further includes: determining, by the determining unit, a fourth data value based on a third data value of a second data type of the apparatus, where the third data value belongs to a third value space, the fourth data value belongs to a fourth value space, and the second data type is any entry in the first data.

With reference to any one of the fifth aspect, or the first to the fourth possible implementations of the fifth aspect, in a fifth possible implementation of the fifth aspect, the second value space is the same as the fourth value space.

With reference to any one of the fifth aspect, or the first to the fifth possible implementations of the fifth aspect, in a sixth possible implementation of the fifth aspect, when the network element is an application function AF network element, the first data further includes one or more of the following information: the identifier of the service to which the service flow belongs, a communication pattern parameter of the service to which the service flow belongs, flow bit rate data of a first interface, latency data of the first interface, packet loss rate data of the first interface, packet data of the first interface, a timestamp, experience data of the service to which the service flow belongs, jitter buffer data, transmission control protocol TCP congestion window data, TCP receive window data, media encoding type data, encoding rate data of the media encoding type data, and buffer data, where the first interface is an interface between a user plane function UPF network element and a data network DN that corresponds to the AF network element; when the network element is a policy control function PCF network element, the first data further includes one or more of the following information: the identifier of the service to which the service flow belongs, an identifier of a session to which the service flow belongs, a data network name DNN of the session to which the service flow belongs, identification information of a slice to which the service flow belongs, IP filtering information, a media bandwidth requirement, traffic routing information, a jitter buffer requirement, a TCP congestion window requirement, a TCP receive window requirement, a media encoding type requirement, an encoding rate requirement in the media encoding type requirement, a validity time window of the identifier of the service, and a radio access technology type; when the network element is a session management function SMF network element, the first data further includes one or more of the following information: an identifier of the service flow, an identifier of a session to which the service flow belongs, a DNN of the session to which the service flow belongs, identification information of a slice to which the service flow belongs, a validity time window of the identifier of the service flow, and a radio access technology type; when the network element is a first UPF network element, the first data further includes one or more of the following information: an identifier of the service flow, a timestamp, flow bit rate data of a second interface, flow bit rate data of a first interface, bit rate data of a third interface, latency data of the second interface, latency data of the first interface, latency data of the third interface, packet loss rate data of the first interface, packet loss rate data of the second interface, packet loss rate data of the third interface, packet data of the first interface, packet data of the second interface, and packet data of the third interface, where the second interface is an interface between the first UPF network element and a radio access network RAN device, and the third interface is an interface between the first UPF network element and a second UPF network element; when the network element is an access and mobility management AMF network element, the first data further includes at least one of the following information: location information of the terminal corresponding to the service flow, an identifier of a session to which the service flow belongs, a DNN of the session to which the service flow belongs, identification information of a slice to which the service flow belongs, a validity time window of the identifier of the session to which the service flow belongs, and a radio access technology type; when the network element is a RAN device, the first data further includes one or more of the following information: location information of the terminal corresponding to the service flow, an identifier of the service flow, an identifier of a session to which the service flow belongs, identification information of a slice to which the service flow belongs, a timestamp, flow bit rate data of a fourth interface, flow bit rate data of a second interface, latency data of the second interface, latency data of the fourth interface, reference signal received power RSRP data, reference signal received quality RSRQ data, signal to interference plus noise ratio SINR data, channel quality information CQI data, block error rate BLER data, packet loss rate data of the second interface, packet loss rate data of the fourth interface, packet data of the second interface, packet data of the fourth interface, a radio access technology type, and dual connectivity indication information, where the fourth interface is an interface between the RAN device and the terminal; or when the network element is a terminal, the first data further includes one or more of the following information: location information of the terminal that uses the service flow, an identifier of the service flow, an identifier of a session to which the service flow belongs, a DNN of the session to which the service flow belongs, identification information of a slice to which the service flow belongs, flow bit rate data of a fourth interface, latency data of the fourth interface, packet loss rate data of the fourth interface, packet data of the fourth interface, a timestamp, processor CPU usage data, memory usage data, service experience data, jitter buffer data, transmission control protocol TCP congestion window data, TCP receive window data, media encoding type data, encoding rate data of the media encoding type data, reference signal received power RSRP data, reference signal received quality RSRQ data, signal to interference plus noise ratio SINR data, channel quality information CQI data, block error rate BLER data, and buffer data.

With reference to any one of the fifth aspect, or the first to the sixth possible implementations of the fifth aspect, in a seventh possible implementation of the fifth aspect, when the apparatus is a policy control network element, the receiving unit is further configured to receive a second request sent from an application function AF network element, where the second request is used to request to establish the service flow, and the second request includes one or more of the following information: the identifier of the service to which the service flow belongs, IP filtering information, a media bandwidth requirement, traffic routing information, a jitter buffer requirement, a TCP congestion window requirement, a TCP receive window requirement, a media encoding type requirement, an encoding rate requirement in the media encoding type requirement, a buffer requirement, and a requirement for at least one data type.

With reference to any one of the fifth aspect, or the first to the seventh possible implementations of the fifth aspect, in an eighth possible implementation of the fifth aspect, the first identifier is one or more of the following information: the identifier of the service to which the service flow belongs, the identifier of the service flow, the identifier of the terminal, the identifier of the session to which the service flow belongs, the DNN of the session to which the service flow belongs, the identification information of the slice to which the service flow belongs.

With reference to any one of the fifth aspect, or the first to the eighth possible implementations of the fifth aspect, in a ninth possible implementation of the fifth aspect, the service flow is a quality of service flow or a service data flow.

With reference to any one of the fifth aspect, or the first to the ninth possible implementations of the fifth aspect, in a tenth possible implementation of the fifth aspect, the data value of the data type of the network element further includes: determining, by the determining unit, a sixth data value based on a fifth data value of a third data type of the apparatus, where the fifth data value belongs to a fifth value space, the sixth data value belongs to a sixth value space, and the third data type is any entry in the first data.

With reference to any one of the fifth aspect, or the first to the tenth possible implementations of the fifth aspect, in an eleventh possible implementation of the fifth aspect, every two of the second value space, the fourth value space, and the sixth value space are the same.

With reference to any one of the fifth aspect, or the first to the eleventh possible implementations of the fifth aspect, in a twelfth possible implementation of the fifth aspect, the sending unit is configured to send the first data to an operation, administration and maintenance network element.

In another possible design, an embodiment of this application further provides a data sending apparatus. The data sending apparatus may be a network element or a chip applied to a network element. The data sending apparatus includes a processor and a communications interface. The communications interface is configured to support the data sending apparatus in performing message/data receiving and sending steps on the data sending apparatus side in any one of the second aspect or the possible implementations of the second aspect. The processor is configured to: support the data sending apparatus in performing a message/data processing step on the data sending apparatus side in any one of the second aspect or the possible implementations of the second aspect. For a specific corresponding step, refer to the description in any one of the second aspect or the possible implementations of the second aspect. Details are not described in this embodiment of this application again.

Optionally, the communications interface and the processor of the data sending apparatus are coupled to each other.

Optionally, the data sending apparatus may further include a memory, configured to store code and data. The processor, the communications interface, and the memory are coupled to each other.

According to a sixth aspect, this application provides a data sending apparatus. The data sending apparatus may implement the method in the third aspect or any possible implementation of the third aspect, and therefore can achieve beneficial effects in the third aspect or any possible implementation of the third aspect. The data sending apparatus may be a network element, or may be an apparatus that can support a network element in implementing the method in the third aspect or any possible implementation of the third aspect, for example, a chip applied to the network element. The apparatus may implement the foregoing method by using software or hardware, or by hardware executing corresponding software.

In a possible design, an embodiment of this application provides a data sending apparatus. The data sending apparatus is a network element or a chip applied to a network element. The apparatus includes: a sending unit, configured to send, to a first network element, a first message used to instruct the first network element to obtain, from at least two network elements, first data corresponding to a service flow, and the first message includes one or more of the following information: an identifier of a service to which the service flow belongs, a terminal type of a terminal corresponding to the service flow, a network area in which the terminal corresponding to the service flow is located, and a time window corresponding to the service flow.

In another possible design, an embodiment of this application further provides a data sending apparatus. The data sending apparatus may be a network element or a chip applied to a network element. The data sending apparatus includes a communications interface. The communications interface is configured to support the data sending apparatus in performing a message/data receiving and sending steps on the data sending apparatus side in any one of the third aspect or the possible implementations of the third aspect.

Optionally, the apparatus further includes a processor, configured to: support the data sending apparatus in performing a message/data processing step on the data sending apparatus side in any one of the third aspect or the possible implementations of the third aspect. For a specific corresponding step, refer to the description in any one of the third aspect or the possible implementations of the third aspect. Details are not described in this embodiment of this application again.

Optionally, the communications interface and the processor of the data sending apparatus are coupled to each other.

Optionally, the data sending apparatus may further include a memory, configured to store code and data. The processor, the communications interface, and the memory are coupled to each other.

According to a seventh aspect, this application provides a computer-readable storage medium. The computer-readable storage medium stores an instruction, and when the instruction is run on a computer, the computer is enabled to perform one or more of the first aspect and the possible implementations of the first aspect.

According to an eighth aspect, this application provides a computer-readable storage medium. The computer-readable storage medium stores an instruction, and when the instruction is run on a computer, the computer is enabled to perform one or more of the second aspect and the possible implementations of the second aspect.

According to a ninth aspect, this application provides a computer-readable storage medium. The computer-readable storage medium stores an instruction, and when the instruction is run on a computer, the computer is enabled to perform one or more of the third aspect and the possible implementations of the fifth aspect.

According to a tenth aspect, this application provides a computer program product including an instruction. When the computer program product is run on a computer, the computer is enabled to perform one or more of the first aspect and the possible designs of the first aspect.

According to an eleventh aspect, this application provides a computer program product including an instruction. When the computer program product is run on a computer, the computer is enabled to perform one or more of the second aspect and the possible designs of the second aspect.

According to a twelfth aspect, this application provides a computer program product including an instruction. When the computer program product is run on a computer, the computer is enabled to perform one or more of the third aspect and the possible designs of the third aspect.

According to a thirteenth aspect, this application provides a chip, where the chip includes a processor and an interface circuit, the interface circuit is coupled to the processor, and the processor is configured to run a computer program or an instruction, to implement one or more of the first aspect and the possible implementations of the first aspect.

According to a fourteenth aspect, this application provides a chip, where the chip includes a processor and an interface circuit, the interface circuit is coupled to the processor, and the processor is configured to run a computer program or an instruction, to implement one or more of the second aspect and the possible implementations of the second aspect.

According to a fifteenth aspect, this application provides a chip, where the chip includes a processor and an interface circuit, the interface circuit is coupled to the processor, and the processor is configured to run a computer program or an instruction, to implement one or more of the third aspect and the possible implementations of the third aspect.

Optionally, the aforementioned chip in this application may further include at least one memory. The at least one memory stores an instruction or a computer program.

According to a sixteenth aspect, an embodiment of this application provides a data processing system, where the data processing system includes the data processing apparatus described in the fourth aspect and the possible implementations of the fourth aspect, and at least two data sending apparatuses described in the fifth aspect and the possible implementations of the fifth aspect.

Optionally, the data processing system further includes the data sending apparatus described in the sixth aspect.

DESCRIPTION OF EMBODIMENTS

Figure 1:
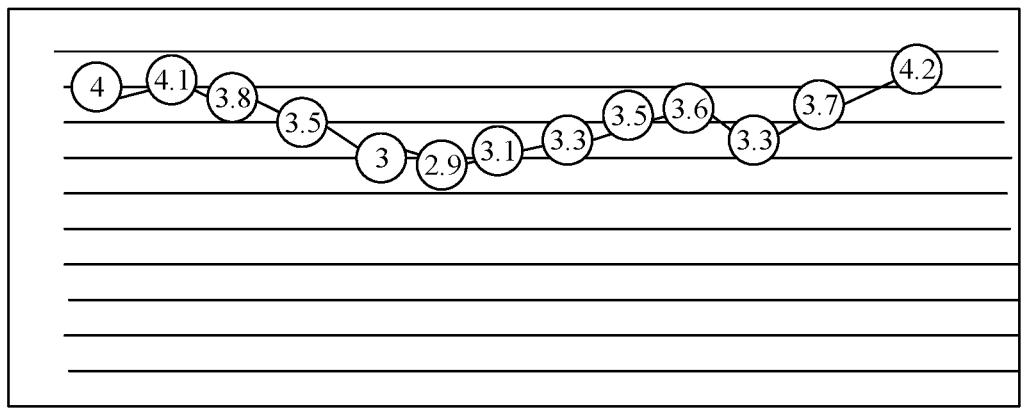
FIG. 1 is a diagram of a voice MOS change curve in the prior art.

To clearly describe the technical solutions in embodiments of this application, terms, such as "first" and "second", are used in the embodiments of this application to distinguish between same items or similar items that have a basically same function and usage. For example, a first network element and a second network element are merely intended to distinguish between different network elements, and are not intended to limit a sequence thereof. A person skilled in the art may understand that the terms such as "first" and "second" do not limit a quantity or an execution sequence, and that the terms such as "first" and "second" do not indicate a definite difference.

It should be noted that, in this application, the word "for example" is used to represent giving an example, an illustration, or a description. Any embodiment or design scheme described as "for example" in this application should not be explained as being more preferred or having more advantages than another embodiment or design scheme. Exactly, use of the word "example" or the like is intended to present a relative concept in a specific manner.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

In this application, "at least one" refers to one or more, and "a plurality of" refers to two or more. The term "and/or" describes a correlation relationship for describing correlated objects and represents that three relationships may exist. For example, A and/or B may represent the following cases: Only A exists, both A and B exist, and only B exists, where A and B may be in a singular or plural form. The character "/" generally indicates an "or" relationship between the correlated objects. "At least one of the following items (pieces)" or a similar expression thereof indicates any combination of these items, including any combination of a singular item (piece) or a plurality of items (pieces). For example, at least one of a, b, or c may represent a, b, c, a-b, a-c, b-c, or a-b-c, where a, b, and c may be in a singular or plural form.

The technical solutions in the embodiments of this application may be applied to various communications systems for data processing, for example, code division multiple access (CDMA), time division multiple access (TDMA), frequency division multiple access (FDMA), orthogonal frequency division multiple access (OFDMA), single carrier frequency division multiple access (SC-FDMA), and another system. The terms "system" and "network" can be interchanged with each other. The CDMA system may implement wireless technologies such as universal terrestrial radio access (UTRA) and CDMA2000. UTRA may include a wideband CDMA (WCDMA) technology and another variation technology of CDMA. CDMA2000 may cover the interim standard (IS) 2000 (IS-2000), the IS-95 standard, and the IS-856 standard. The TDMA system may implement a radio technology such as a global system for mobile communications (GSM). The OFDMA system may implement radio technologies such as evolved universal terrestrial radio access (E-UTRA), ultra mobile broadband (UMB), IEEE 802.11 (Wi-Fi), IEEE 802.16 (WiMAX), IEEE 802.20, and flash OFDMA. UTRA and E-UTRA are evolved versions of the UMTS. A new version of the UMTS, namely, the E-UTRA, is used in 3GPP long term evolution (LTE) and various versions evolved based on LTE. A 5G communications system and new radio (NR) are next-generation communications systems under study. In addition, the communications systems may be further applied to a future-oriented communications technology, and are applicable to the technical solutions provided in the embodiments of this application.

The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems. In the embodiments of this application, that the provided method is applied to an NR system or a 5G network is used as an example for description.

Figure 2:
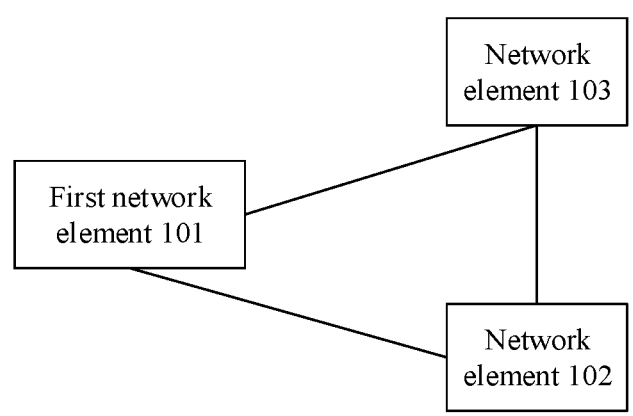
FIG. 2 is a schematic structural diagram of a data processing system according to an embodiment of this application.

FIG. 2 is a schematic architecture diagram of a data processing system to which a data processing method according to the embodiments of this application is applied. As shown in FIG. 2, the data processing system includes a first network element 101 and at least two network elements connected to the first network element 101 (FIG. 2 shows only two network elements, for example, a network element 102 and a network element 103. It may be understood that there may be more than two network elements in an actual process).

It may be understood that the at least two network elements in the embodiments of this application may be connected to each other. For example, the network element 102 and the network element 103 in FIG. 2 are connected to each other.

It may be understood that, in the at least two network elements in the embodiments of this application, one network element is configured to provide the first network element with service data that is on the network element and that corresponds to a service flow, and another network element in the at least two network elements is configured to provide the first network element with network data that is of the service flow and that is on the another network element.

For example, the service data in this application may be: data of parameters such as an identifier of a service to which the service flow belongs, bandwidth, latency, a packet loss rate, a jitter buffer, a TCP congestion window, a TCP receive window, a media encoding type, and a media encoding rate.

It may be understood that, in the embodiments of this application, data of a parameter may be a size, a value, or a requirement of the parameter. For example, CQI data may refer to a size or a value of CQI. In the embodiments of the present disclosure, data, a size, a value, or a requirement of a parameter indicates a data value collected or obtained by a corresponding network element for the parameter. For all related content below, refer to the description herein. Details are not described again subsequently.

The network data in this application may be any one of the following parameters: parameter data such as bandwidth, latency, a packet loss rate, reference signal received power (RSRP), reference signal received quality (RSRQ), a block error rate (BLER), and a channel quality indicator (CQI), slice identifier information, and a data network name (DNN).

The first network element 101 and the at least two network elements may be directly connected, or may be indirectly connected by using another network element. This is not limited in the embodiments of this application.

Based on this, the network element that is in the at least two network elements and that is configured to provide the network data for the first network element may be a terminal, or a network element that belongs to a core network or an access network.

For example, the network element configured to provide the network data for the first network element may be one or more of a user plane network element and a control plane network element in the core network.

For example, in a fourth generation (4G) network, the user plane network element may be, for example, a public data network gateway (PDN GW, PGW) or a serving network element (SGW), and the control plane network element may be a mobility management entity (MME).

In the embodiments of the present disclosure, terminals may be widely distributed in a wireless network. Each terminal may be stationary or moving.

Figure 3:
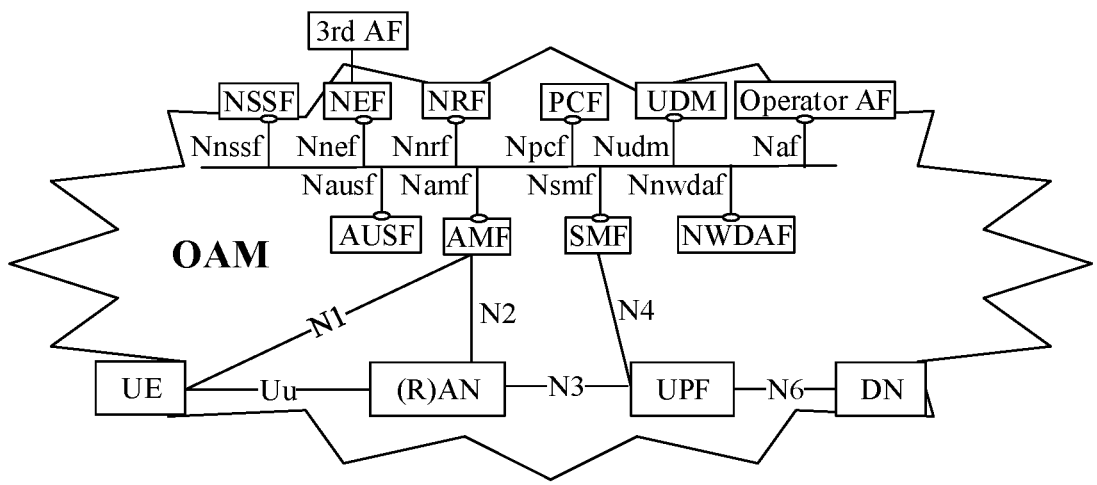
FIG. 3 is a schematic diagram of a 5G network according to an embodiment of this application.

If the foregoing data processing system is applied to a 5G network, a network element or an entity corresponding to the first network element 101 may be a network data analytics function (NWDAF) network element, as shown in FIG. 3. Network elements or entities corresponding to the at least two network elements may be any two different network elements in the following plurality of network elements: an application function (AF) network element (also referred to as a service function network element), a policy control function (PCF) network element, a session management function (SMF) network element, a user plane function (UPF) network element, an access and mobility management function (AMF) network element, a radio access network (RAN) device, and a terminal.

The RAN device is a network element belonging to a radio access network. The PCF network element, the SMF network element, the AMF network element, and the UPF network element are network elements belonging to a core network.

A network element 102 in the at least two network elements provides the first network element with service data that corresponds to a service flow and that is on the network element 102, and another network element 103 provides network data of the service flow on the network element 103. For example, the network element 102 may be an AF network element, and the network element 103 may be an AMF network element. Alternatively, the network element 102 may be an AF network element, and the network element 103 may be a UPF network element.

In addition, as shown in FIG. 3, the 5G network may further include an access device (for example, an access network (AN)), a unified data management (UDM) network element, an authentication server function (AUSF) network element, a network slice selection function (NSSF) network element, a network exposure function (NEF) network element, a network repository function (NRF) network element, and the like. This is not specifically limited in the embodiments of this application.

As shown in FIG. 3, an operation, administration and maintenance (O&M) (OAM) network element may cover all network elements in the access network and the core network, and may collect data from all the network elements in the access network and the core network. In addition, the OAM network element in the embodiments of this application may also collect network data that is on a service flow level.

The terminal communicates with the AMF network element through an N1 interface (N1). The AMF entity communicates with the SMF network element through an N11 interface (N11). The SMF network element communicates with one or more UPF network elements through an N4 interface (N4). Any two of the one or more UPF network elements communicate with each other through an N9 interface (N9). The UPF network element communicates, through an N6 interface (N6), with a data network (DN) managed and controlled by the AF network element. The terminal accesses a network by using an access device (for example, a RAN device), and the access device communicates with the AMF network element through an N2 interface (N2). The SMF network element communicates with the PCF network element through an N7 interface (N7), and the PCF network element communicates with the AF network element through an N5 interface. The access device communicates with the UPF network element through an N3 interface (N3). Any two AMF network elements communicate with each other through an N14 interface (N14). The SMF network element communicates with the UDM network element through an N10 interface (N10). The AMF network element communicates with the AUSF through an N12 interface (N12). The AUSF network element communicates with the UDM network element through an N13 interface (N13). The AMF network element communicates with the UDM network element through an N8 interface (N8).

It should be noted that both a 3rd-party AF network element and an operator AF in FIG. 3 are AF network elements, and differences lie in that the 3rd-party AF network element (for example, a WeChat service server or an Alipay payment service server) is not managed and controlled by an operator, but the operator AF network element (for example, a proxy-call session control function (P-CSCF) network element in an IP multimedia system) is managed and controlled by an operator, and the NEF network element needs to be used when the 3rd-party AF network element interacts with the NWDAF network element.

The PCF network element is configured to forward signaling or data of the AF network element to the SMF network element.

It should be noted that names of the interfaces between the network elements in FIG. 3 are merely examples, and the interfaces may have other names in specific implementation. This is not specifically limited in the embodiments of this application.

It should be noted that the access device, the AF network element, the AMF network element, the SMF network element, the AUSF network element, the UDM network element, the UPF network element, the PCF network element, and the like in FIG. 3 are merely names, and the names do not constitute any limitation on the devices. In a 5G network and another future network, network elements or entities corresponding to the access device, the AF network element, the AMF network element, the SMF network element, the AUSF network element, the UDM network element, the UPF network element, and the PCF network element may have other names. This is not specifically limited in the embodiments of this application. For example, the UDM network element may be replaced with a home subscriber server (HSS), a user subscription database (USD), a database entity, or the like. A description is provided herein, and details are not described below again.

It should be noted that, in this application, a session is a communications link that is established by the SMF network element and that connects a terminal to a data network. The communications link includes a terminal, an access device, a UPF network element, and a data network corresponding to the UPF network element. The session may be a protocol data unit session (PDU session) PDU, and the PDU session is used to provide a PDU data packet. In addition, to establish the session, an AMF network element, an SMF network element, and a PCF network element that are of a control plane need to cooperate.

It should be noted that, in this application, the service flow includes a QoS flow or a service data flow. The QoS flow or the service data flow is a communications link that is of a service in the PDU session and that connects a terminal and a data network. The communications link includes a terminal, an access device, a UPF network element, and a data network corresponding to the UPF network element. In addition, an AMF network element, an SMF network element, and a PCF network element that are of a control plane need to cooperate to establish the service flow.

Alternatively, the terminal in this application may also be referred to as a terminal device, user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a station (STA) in wireless local area networks (WLAN), and may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, and a next-generation communications system, for example, a terminal device in a fifth-generation (5G) network, or a terminal device in a future evolved public land mobile network (PLMN).

In an example, in the embodiments of the present disclosure, the terminal may alternatively be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on the body or integrated into clothes or an accessory of a user. The wearable device is not merely a hardware device, and further implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

Optionally, the access device in the embodiments of this application is a device that accesses a core network, for example, a base station, a broadband network gateway (BNG), an aggregation switch, or anon-3rd generation partnership project (3GPP) access device. The base station may include a macro base station, a micro base station (also referred to as a small cell), a relay station, an access point, and or the like in various forms.

Optionally, the AMF network element in the embodiments of this application may be further responsible for functions such as registration management, mobility management, and lawful interception. This is not specifically limited in the embodiments of this application.

Optionally, the SMF network element in the embodiments of this application is configured to perform session management, including: session establishment, session modification, and session release, internet protocol (IP) address assignment and management of the terminal, selection and control of the UPF entity, lawful interception, and other session-related control functions.

Optionally, in addition to a function of the user plane function network element shown in FIG. 3, the UPF network element in the embodiments of this application may further implement user plane functions of a serving gateway (SGW) and a packet data network gateway (PGW). In addition, the UPF network element may be alternatively a software-defined network (SDN) switch. This is not specifically limited in the embodiments of this application.

Optionally, the AUSF network element in the embodiments of this application is configured to authenticate the terminal based on subscription data of the terminal.

Optionally, the UDM network element in the embodiments of this application is configured to store user subscription data. In addition, the UDM network element further includes functions such as authentication, user identifier processing, and subscription management. This is not specifically limited in the embodiments of this application.

Optionally, the PCF network element in the embodiments of this application provides a policy rule and implements policy-related functions, such as supporting unified policy architecture to manage network behavior.

Optionally, the user plane function network element in FIG. 3 may be implemented by a physical device, or may be jointly implemented by a plurality of physical devices, or may be a logical functional module in a physical device. This is not specifically limited in the embodiments of this application.

The SMF network element is configured to reallocate a UPF network element to the terminal based on location information of the terminal, a feature of data sent from the terminal, or location information between a UPF network element and the terminal, or quality of service of a UPF network element, to re-establish a session between the terminal and the newly allocated UPF network element, so that a user plane can be optimized by improving quality of a re-established session.

The access device is configured to provide a data service for the terminal, for example, receive data sent from the terminal or send data to the terminal. The access device may be a base station in an actual use process. In the embodiments of the present disclosure, the base station (BS) may be a device that communicates with user equipment (UE) or another communications station such as a relay station, and the base station may provide communication coverage in a specific physical area.

The PCF network element is configured to: receive service information from the AF network element, and generate and distribute, based on the service information, a QoS parameter corresponding to the service flow.

The AF network element is configured to: trigger the NWDAF network element to collect first data that corresponds to the service flow and that is on different network elements, and send, to the NWDAF network element, first data that corresponds to the service flow and that is on the AF network element.

The DN is an external network that provides a data service.

The service flow in the embodiments of this application refers to a data packet transmission channel of a service between the terminal and the data network, and is identified by using an IP 5-tuple.

The NWDAF network element is configured to: collect time-varying network data, services data, or terminal data, and corresponding service experience data, and obtain, through analysis, at least one set of QoS parameters in different network conditions (corresponding to network data), service conditions (corresponding to service data), or terminal conditions (corresponding to terminal data) of a service. For example, the NWDAF network element may collect air-interface flow bit rate data (a data value, a size, a requirement, and the like) of a service on a base station, and obtain a GFBR through analysis. Alternatively, the NWDAF network element may collect latency data (a data value, a size, a requirement, and the like) of a service between the base station and the UPF, and obtain a PDB through analysis. Alternatively, the NWDAF may collect TCP congestion window (CWND) data (a data value, a size, a requirement, and the like) or TCP receive window (receiver window, RWND) data (a data value, a size, a requirement, and the like) on the AF network element or the terminal, and obtain a recommended CWND or a recommended RWND through analysis. Alternatively, the NWDAF may collect jitter buffer data on the AF network element or the terminal, and obtain a recommended jitter buffer through analysis.

For a service, at least one set of QoS parameters are required. This is because, for example, considering a service experience requirement (for example, a service MOS is greater than 3.0) in vertical industries, packet delay data conflicts with packet loss rate data.

In an example 1, within weak coverage, a RAN may transmit a data packet for a plurality of times to ensure a packet loss rate. However, in this case, a packet delay is increased, and further, a flow bit rate may be increased.

In an example 2, within strong coverage, a RAN does not need to a transmit data packet for a plurality of times. In this case, both a packet loss rate and a packet delay can be ensured, and further, a flow bit rate may be reduced.

Therefore, for a service, there are one or more sets of QoS parameters.

Specifically, the NWDAF network element uses a big data method to obtain at least one set of QoS parameters of a service based on time variation network data, service data, or terminal data, and corresponding service experience data. The process is as follows:

Step 1: The NWDAF network element first collects data separately from network elements such as the AF network element, the RAN device, the UPF network element, the UE, the AMF network element, the SMF network element, and the PCF network element, and then correlates data on all the network elements by using information such as a service identifier, a service flow identifier, a terminal identifier, an identifier of a session to which a service flow belongs, a correlation identifier on each network element, and time, to obtain complete training data. The training data includes:

(1) service experience data that is from the AF network element; and (2) other time variation parameter data that affects the service experience data, including:

a. TCP congestion window data, TCP receive window data, jitter buffer data, media encoding type and encoding rate data, buffer data, and data of at least one data type that are from the AF network element;

b. flow bit rate data, packet loss rate data, latency data, radio channel quality data, and data of at least one data type that are from the RAN network element;

c. flow bit rate data, packet loss rate data, latency data, and data of at least one data type that are from the UPF network element;

d. flow bit rate data, packet loss rate data, latency data, TCP congestion window data, TCP receive window data, jitter buffer data, media encoding type and encoding rate data, buffer data, CPU usage, memory usage, and data of at least one data type that are from the UE. The training data is not limited to the foregoing data.

Step 2: The NWDAF network element obtains, based on a linear regression method, a relational model, namely, a service experience model, between service experience and other time variation parameter data that affects the service experience data and the NWDAF network element may plan one or more sets of QoS parameters of a service based on the service experience model.

In addition, based on the obtained training data, the NWDAF may be further configured for UPF routing path selection, user-plane or control-plane fault diagnosis, and the like.

As shown in Table 1 and Table 2, Table 1, Table 2, and Table 3 show information related to service data and network data that are provided in the embodiments of this application.

TABLE 1

Service data

| Information | Network element name | Description 1 | Description 2 |
| --- | --- | --- | --- |
| AF ID | AMF network element | AF identifier | Identifies a service server |
| correlation ID | | Correlation identifier | Used to correlate network data with service data |
| application ID | | Service identifier | Identifies a service, that is, a service ID |
| timestamp | | Timestamp | Dotting time, used to record a time at which a third-party AF calculates service experience information, and also used to correlate service data with network data |
| UE ID | | Terminal identifier | Identifies a terminal, and used to correlate first data that corresponds to a service flow and that is on different network elements |
| communication pattern parameters | | Communication pattern parameter | Service communication pattern, which is mainly a set of parameters for an extremely ultra-reliable low-latency communication (ultra-reliable and low-latency communication, URLLC) service, for example, a periodic interactive service (for example, a narrowband internet of things (narrowband internet of things, NB-IoT) metering service, once per month). |
| TCP congestion window size | | TCP congestion window size | TCP congestion window size |
| TCP receiver window size | | TCP receive window size | TCP receive window size |
| media/application codec/codec mode | | Media/Service encoding type/ encoding rate | Media/Service encoding type or encoding rate |
| media/application bandwidth | | Media/Service bandwidth | Media/Service bandwidth |
| Service experience | | Service experience | Service experience data, used for network QoS parameter |

TABLE 1-continued

Service data

| Information | Network element name | Description 1 | Description 2 |
|---|---|---|---|
| | | | formulation, UPF selection, and the like |
| Feature Z1 | | Data type Z1 on the AF network element and affecting service experience | Specific data type of a service corresponding to the application ID on the AF network element, where the data type is invisible or visible to the AF network element |
| ... feature ZZ | | ... Data type ZZ on the AF network element and affecting service experience | ... Specific data type of a service corresponding to the application ID on the AF, where the data type is invisible or visible to the AF |

For the UE ID in the embodiments of this application, refer to the identifier of the terminal. Details are not described herein again.

TABLE 2

Network data

| Information | Network element name | Description 1 | Description 2 (example) |
|---|---|---|---|
| AF ID | PCF network element | AF identifier | Identifies a service server |
| application ID | PCF network element | Service identifier | Identifies a service, that is, a service ID |
| UE ID | PCF network element/AMF network element/SMF network element | Terminal identifier | Identifies a terminal, and used to correlate first data that corresponds to a service flow and that is on different network elements |
| quality of service flow identifier (QoS flow identifier, QFI) | SMF network element/UPF network element/RAN device | Flow identifier | Identifies a service data flow or a QoS flow |
| Protocol data unit (protocol data unit, PDU) session ID | SMF network element/UPF network element/RAN device | PDU session identifier | Identifies a session to which a service flow belongs |
| Single network slice selection assistance information (S-NSSAI) | RAN device/AMF network element/SMF network element/PCF network element | Slice type identifier | Used to identify a slice type |
| Network slice instance (NSI) ID | RAN device/AMF network element/SMF network element/PCF network element | Slice instance identifier | Used to identify a slice instance |

TABLE 2-continued

Network data

| Information | Network element name | Description 1 | Description 2 (example) |
|---|---|---|---|
| correlation ID | UE/RAN device/AMF network element/SMF network element/UPF network element/PCF network element/AF network element | Correlation identifier, that is, a first identifier in the following embodiments | Special correlation identifier, used to correlate first data that corresponds to a service flow and that is on different network elements |
| timestamp | Timestamps corresponding to all network elements when the network elements report data | Timestamp | Records a time point at which each indicator is recorded on a corresponding network element, and sets a (quality of service, QoS) parameter: Average Window Size |
| RAN ID/Cell ID | RAN device/AMF network element | Base station identifier or cell identifier | Identifies a base station or a cell that serves a service flow |
| RAN tunnel information | RAN device | Tunnel information on the base station | Identifies a tunnel through which the service flow is connected to the UPF network element on the RAN device |
| Uplink (UL) or downlink (DL) Uu-Packet Delay | RAN device | Uplink/Downlink Uu interface packet delay | Specifies a QoS parameter such as a Uu-PDB |
| UL or DL N3-Packet Delay | RAN device/UPF network element | Uplink/Downlink N3 interface packet delay | Specifies a QoS parameter: N3-PDB |
| UL or DL Uu-FBR | RAN device | Uplink/Downlink Uu interface flow bandwidth | Specifies a QoS parameter: Uu-GFBR (Guaranteed Flow Bit Rate) |
| UL or DL N3-FBR | RAN device/UPF network element | Uplink/Downlink N3 interface flow bandwidth | Specifies a QoS parameter such as an N3-GFBR |
| UL or DL PLR | RAN device | Uplink/Downlink packet loss rate | Specifies a QoS parameter such as a Max PLR (maximum packet loss rate) |
| UL or DL PER | RAN device | Uplink/Downlink packet error rate | Specifies a QoS parameter: PER (packet error rate) |
| data burst volume | RAN device | Data burst size | Specifies a QoS parameter: Maximum Data Burst Volume |
| RSRP/RSRQ/SINR/CQI | RAN network element | Four types of radio channel quality, for example, CQI, RSRP, RSRQ, and a BLER | Radio channel quality on the RAN device side, used to Specifies a QoS parameter: HO threshold/Max PLR |
| RAT Type | RAN network element | Radio access technology type, for example, LTE | Identifies a radio access technology type of a terminal |
| Dual Connectivity | RAN network element | Dual connectivity indication information | Dual connectivity indication information |

TABLE 2-continued

| Information | Network element name | Description 1 | Description 2 (example) |
|---|---|---|---|
| feature X1 | RAN network element | Data type X1 on the RAN and affecting service experience | Specific data type on the RAN device, where the data type is invisible or visible to the NWDAF, used to specify a QoS parameter visible to the RAN device |
| . . . | . . . | . . . | |
| feature XX | RAN network element | Data type XX on the RAN and affecting service experience | Specific data type on the RAN device, where the data type is invisible or visible to the NWDAF network element, used to specify a QoS parameter visible to the RAN device |
| UPF ID | UPF network element | UPF identifier | Identifies a UPF network element that serves a service data flow, used for UPF network element selection/traffic routing |
| UPF tunnel information | UPF network element | UPF tunnel identifier | Identifies a tunnel through which the service flow is connected to the RAN device on the UPF network element, used for UPF network element selection/traffic routing |
| UL or DL N9-Packet Delay/N6-packet delay | UPF network element | Uplink or downlink N9/N6 interface packet delay | Specifies a QoS parameter: N9-PDB or N6-PDB |
| UL or DL N9-FBR/N6-FBR | UPF network element | Uplink or downlink N9/N6 interface packet bandwidth | Specifies a QoS Parameter: N9-GFBR or N6-PDB |
| UL or DL packet size | UPF network element | Size of an uplink or downlink packet flowing through the UPF network element | Traffic pattern of UE is obtained for analyzing whether UE is suffering a security attack |
| feature Y1 | UPF network element | Data type Y1 on the UPF network element and affecting service experience | Specific data type on the UPF network element, where the data type is invisible or visible to the NWDAF network element, used to specify a QoS parameter visible to the UPF network element |
| . . . | . . . | . . . | |
| feature YY | UPF network element | Data type YY on the UPF network element and affecting service experience | Specific data type on the UPF network element, where the data type is invisible or visible to the NWDAF network element, used to specify a QoS parameter visible to the UPF network element |
| N4 session ID | UPF network element/SMF network element | N4 session identifier | Identifies a signaling channel between the SMF network element and the UPF network element |
| SMF ID | SMF network element | SMF identifier | Identifies an SMF network element |
| network slice instance topology info | SMF network element | Slice instance topology information | Used for UPF network element selection/traffic routing |
| RAT Type | SMF network element | Radio access technology type, for example, LTE | Identifies a radio access technology type of a terminal |
| feature P1 | SMF network element | Data type P1 on the SMF network element and affecting service experience | Specific data type on the SMF network element, where the data type is invisible or visible to the NWDAF network element, used to specify a QoS parameter visible to the SMF network element |
| . . . | . . . | . . . | |
| feature PP | SMF network element | Data type PP on the SMF network element and affecting service experience | Specific data type on the SMF network element, where the data type is invisible or visible to the NWDAF network element, used to specify a QoS parameter visible to the SMF network element |
| AMF ID | AMF network element | AMF identifier | Identifies an AMF network element |
| Network Area (TA list/TA/RA list/RA) | AMF network element | Network area (UE tracking area list, tracking area, routing area list, and routing area) | Identifies a network area of UE |
| RAT Type | AMF network element | Radio access technology type, for example, LTE | Identifies a radio access technology type of a terminal |
| feature Q1 | AMF network element | Data type Q1 on the AMF network element and affecting service experience | Specific data type on the AMF network element, where the data type is invisible or visible to the NWDAF, used to specify a QoS parameter visible to the AMF network element |
| . . . | . . . | . . . | |

TABLE 2-continued

Network data

| Information | Network element name | Description 1 | Description 2 (example) |
|---|---|---|---|
| feature QQ | AMF network element | Data type QQ on the AMF network element and affecting service experience | Specific data type on the AMF network element, where the data type is invisible or visible to the NWDAF network element, used to specify a QoS parameter visible to the AMF network element |
| PCF ID | PCF network element | PCF identifier | Identifies a PCF network element |
| IP filter information | PCF network element | IP filtering information | Identifies a service data flow (SDF) from an AF network element |
| media/application bandwidth | PCF network element | Media/Service bandwidth requirement | Service Bandwidth Requirement from the AF network element |
| usage threshold | PCF network element | Use threshold requirement, for example, volume/time threshold | Use threshold requirement for identifying a service from the AF network element |
| traffic routing information | PCF network element | Traffic routing information requirement, for example, a DNAI list | UPF network element selection requirement information from the AF network element |
| RAT Type | PCF network element | Radio access technology type, for example, LTE | Identifies a radio access technology type of a terminal |
| feature M1 | PCF network element | Data type M1 on the PCF network element and affecting service experience | Specific data type on the PCF network element, where the data type is invisible or visible to the NWDAF network element, used to Specify a QoS parameter visible to the PCF network element |
| ... | ... | ... | |
| feature MM | PCF network element | Data type M1 on the PCF network element and affecting service experience | Specific data type on the PCF network element, where the data type is invisible or visible to the NWDAF network element, used to Specify a QoS parameter visible to the PCF network element |

TABLE 3

Terminal data

| Information | Network element name | Description 1 | Description 2 |
|---|---|---|---|
| correlation ID | | Correlation identifier | Special identifier, used to correlate network data with service data |
| application ID | | Service identifier | Identifies a service, that is, a service ID |
| timestamp | | Timestamp | Dotting time, used to record a time at which a third-party AF calculates service experience information, and also used to correlate service data with network data |
| UE ID | | Terminal identifier | Identifies a terminal, and used for first data that corresponds to a service flow and that is on different network elements |
| TCP congestion window size | | TCP congestion window size | TCP congestion window size |
| TCP receiver window size | | TCP receive window size | TCP receive window size |
| media/application codec/codec mode | | Media/Service encoding type/encoding rate | Media/Service encoding type or encoding rate |
| Media/Service bandwidth service experience | | Media/Service bandwidth Service experience | Media/Service bandwidth Service experience data, used for network QoS parameter formulation, UPF network element selection, and the like |
| RSRP/RSRQ/SINR/CQI | | Four types of radio channel quality, for example, CQI, RSRP, RSRQ, and a BLER | Radio channel quality on the RAN network element side, used to Specify a QoS parameter: HO threshold/Max PLR |

TABLE 3-continued

Terminal data

| Information | Network element name | Description 1 | Description 2 |
|---|---|---|---|
| CPU Occupancy | | CPU usage | CPU usage |
| Memory Occupancy | | Memory usage | Memory usage |
| Jitter Buffer Size | | Jitter buffer size | Jitter buffer size |
| Buffer Size | | Buffer size | Buffer size |
| Feature N1 | | Data type N1 on the UE network element and affecting service experience | Specific data type of a service corresponding to the application ID on the UE network element, where the data type is invisible or visible to an NWDAF network element |
| ... | | ... | ... |
| feature NN | | Data type NN on the UE network element and affecting service experience | Specific data type of a service corresponding to the application ID on the UE network element, where the data type is invisible or visible to the NWDAF network element |

As shown in Table 4, Table 4 shows communication pattern parameters related to Table 1.

TABLE 4

Communication pattern parameter

| CP parameter | Description |
|---|---|
| periodic communication indicator | Identifies whether UE performs periodical interaction |
| communication duration time | Duration of each interaction, for example, 5 minutes |
| periodic time | Interaction period, for example, once every one hour or every one month |
| scheduled communication time | Interaction time plan, for example, Time: 13:00-20:00, Day: Monday |
| stationary indication | Identifies whether the UE is stationary or moving |

It may be understood that the data processing method in the embodiments of this application may be performed by the first network element, or may be performed by an apparatus applied to the first network element, for example, a chip. In the following embodiments, an example in which the data processing method is performed by the first network element is used for description. A data sending method in the embodiments of this application may be performed by a network element, or may be performed by an apparatus applied to a network element, for example, a chip. In the following embodiments, an example in which the data sending method is performed by a network element is used for description.

Figure 4:
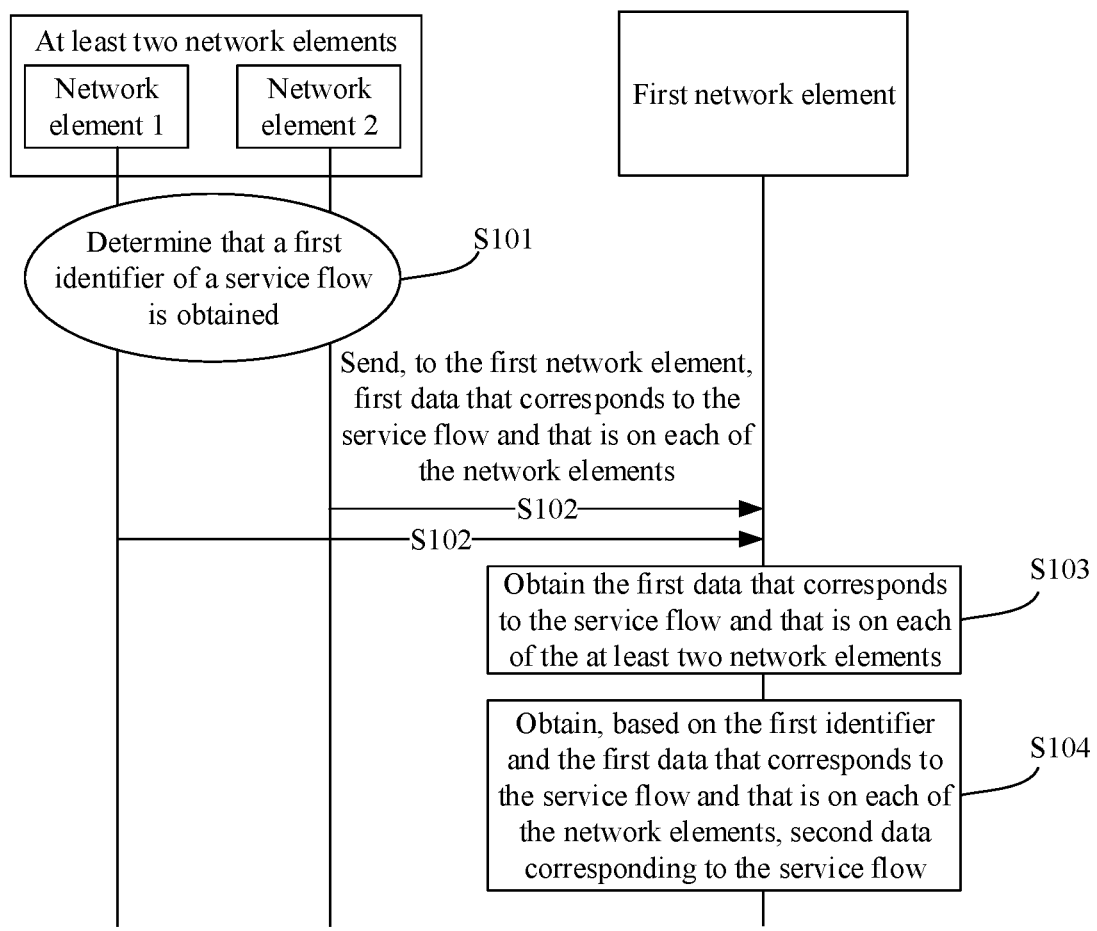
FIG. 4 to FIG. 10 are schematic flowcharts of a data processing method according to embodiments of this application.

FIG. 4 shows a data processing method according to an embodiment of this application. The method includes the following steps.

S101. At least two network elements determine that a first identifier of a service flow is obtained.

Herein, the at least two network elements may be a combination of an AF network element and any one or more of a PCF network element, an AMF network element, an SMF network element, a UPF network element, a RAN device, and a terminal.

For example, in this embodiment of this application, the service flow may be a quality of service flow or a service data flow.

Optionally, in this embodiment of this application, step S101 may be replaced with step S101a. In step S101a, a network element determines that first instruction information is received, where the first instruction information is used to instruct to report first data corresponding to a service flow to a first network element. For example, the first indication may be a network data report indicator.

S102. Each of the at least two network elements sends, to the first network element, first data that corresponds to the service flow and that is on the respective network elements, where the first data carries the first identifier.

For example, the first network element may be the NWDAF network element in FIG. 3.

It should be noted that, when there are at least two network elements, first data that corresponds to a service flow and that is on each of the network elements may be different. For example, the at least two network elements are a network element 1 and a network element 2. First data that corresponds to a service flow and that is on the network element 1 is network data, for example, a flow identifier. First data that corresponds to the service flow and that is on the network element 2 may be service data, for example, an identifier of a terminal. In this case, when the network element 1 and the network element 2 determine that the first identifier is received, the network element 1 sends the flow identifier to the first network element, and the network element 2 sends the identifier of the terminal to the first network element.

For example, the first network element is an NWDAF. Because network elements are different, manners in which the network elements send the first data to the first network element are different. Therefore, the following separately describes the manners.

Example 1: When one of the at least two network elements is at least one of an AMF network element, an SMF network element, and a PCF network element, the network element may directly send, to the first network element through a service-based interface between the network element and the first network element, the first data corresponding to the service flow. The service-based interface may implement direct communication or interaction between any two network elements of an AMF network element, an SMF network element, a PCF network element, an NWDAF network element, and an NEF network element. For example, if the network element is an AMF network element, the network element sends, to the first network element through a service-based interface between the network element and the first network element, first data corresponding to the service flow.

Example 2: When the at least two network elements include a RAN device, first, the RAN device may send first data that corresponds to the service flow and that is on the RAN device to a control plane network element connected to the RAN device, for example, an AMF. Then, the control plane network element connected to the RAN device reports the first data to the first network element through a service-based interface (for example, a service-based interface between the AMF network element and the NWDAF network element) between the first network element and the control plane network element that is connected to the RAN device. Alternatively, the RAN device may send, by using a user plane tunnel established between the RAN device and the first network element, first data that corresponds to the service flow and that is on the RAN device to the first network element.

Example 3: When the at least two network elements include a UPF network element, first, the UPF network element may send first data that corresponds to the service flow and that is on the UPF network element to a control plane network element connected to the UPF network element, for example, an SMF network element. Then, the control plane network element connected to the UPF network element reports the first data to the first network element through a service-based interface (for example, a service-based interface between the SMF network element and the NWDAF network element) between the first network element and the control plane network element that is connected to the UPF network element. Alternatively, the UPF network element may send, by using a user plane tunnel between the UPF network element and the first network element, first data that corresponds to the service flow and that is on the UPF network element.

Example 4: When the at least two network elements include an AF network element, in a manner 1, the AF network element may send first data that corresponds to the service flow and that is on the AF network element to the first network element by using a file transfer protocol (FTP). Alternatively, in a manner 2, the AF network element may send first data that corresponds to the service flow and that is on the AF network element to the first network element by using a user plane tunnel established between the AF network element and the first network element. In a manner 3, the AF network element may constantly report first data that corresponds to the service flow and that is on the AF network element to the first network element by using an Naf_ServiceDataCollectionSubscription_Notify service. In a manner 4, the AF network element may send first data that corresponds to the service flow and that is on the AF network element to the first network element by using an NEF.

Optionally, the first identifier included in the first data that corresponds to the service flow and that is on each of the network elements is one or more of the following information: an identifier of a service to which the service flow belongs, an identifier of the service flow, an identifier of a terminal, an identifier of a session to which the service flow belongs, a data network name (DNN) of the session to which the service flow belongs, and identification information of a slice to which the service flow belongs.

In this embodiment of this application, on one hand, first identifiers carried in the first data sent from the at least two network elements to the first network element may be the same. For example, a first identifier carried in data 1 sent from the network element 1 is the identifier of the session to which the service flow belongs, and a first identifier carried in data 2 sent from the network element 2 may also be the identifier of the session to which the service flow belongs.

On the other hand, first identifiers carried in the first data sent from the at least two network elements to the first network element may be different. For example, a first identifier carried in data 1 sent from the network element 1 is the identifier of the terminal, and a first identifier carried in data 2 sent from the network element 2 may be the identifier of the session to which the service flow belongs.

When first identifiers carried in first data sent from different network elements to the first network element are different, there is a mapping relationship between the first identifiers carried in the first data sent from the different network elements. For example, there is a mapping relationship between an identifier of a session to which the service flow belongs and an identifier of the service flow. In addition, the first network element stores a mapping relationship between the first identifiers sent from the different network elements. In this way, when receiving the first data that corresponds to the service flow and that is sent from the different network elements, the first network element may determine that the first data sent from the different network elements is data corresponding to a same service flow.

S103. The first network element obtains the first data that corresponds to the service flow and that is on each of the at least two network elements, where the first data that corresponds to the service flow and that is on each of the network elements includes the first identifier.

It should be noted that when one of the at least two network elements is the network element in the foregoing various examples, the first network element receives, from the network element in a corresponding manner, the first data corresponding to the service flow. For example, when the network element is the AMF network element, the first network element receives, through the service-based interface between the AMF network element and the first network element, the first data that corresponds to the service flow and that is sent from the AMF network element. Details are not described in this embodiment of this application.

S104. The first network element obtains, based on the first identifier and the first data that corresponds to the service flow and that is on each of the network elements, second data that corresponds to the service flow.

The second data includes at least the first data that corresponds to the service flow and that is on each of the network elements, or the second data includes at least a part of the first data that corresponds to the service flow and that is on each of the network elements.

Specifically, when the first identifiers carried in the first data sent from the at least two network elements are the same, the first network element may directly classify, into a same set based on the first identifiers, first data or at least a part of first data that corresponds to the service flow and that is on different network elements, to obtain the second data. When the first identifiers carried in the first data sent from the at least two network elements are different, the first network element may classify, into a same set based on the pre-stored mapping relationship, first data or at least a part of first data that corresponds to the service flow and that is on different network elements having the mapping relationship, to obtain the second data.

For example, the first data that corresponds to the service flow and that is obtained by the first network element from the network element 1 is a flow identifier, and the first data that corresponds to the service flow and that is obtained from the network element 2 is an identifier of the terminal. The first data on the network element 1 carries an identifier 1, the first data on the network element 2 carries an identifier 2, and there is a mapping relationship between the identifier 1 and the identifier 2. In this case, the first network element may correlate the flow identifier corresponding to the service flow with the identifier of the terminal, to obtain the second data corresponding to the service flow. To be specific, the finally obtained second data includes the flow identifier corresponding to the service flow and the identifier of the terminal, as shown in Table 5.

TABLE 5

Data corresponding to a service flow

| Service flow | First data on a network element 1 | First data on a network element 2 | Second data |
|---|---|---|---|
| Service flow 1 | (Flow identifier, identifier 1) | (Identifier of a terminal, identifier 2) | (Flow identifier, identifier of the terminal) |

Optionally, if the first data does not carry the first identifier, the first data sent from different network elements may be classified into a same set by using a PDU session ID/QFI on the RAN device, a PDU session ID/UE ID/timestamp (timestamp) on the AMF network element, a PDU session ID/QFI/UE ID/timestamp on the SMF network element, a PDU session ID/QFI/timestamp on the UPF network element, a UE ID/application ID/timestamp on the PCF network element, and a UE ID/application ID/timestamp on the AF network element.

It should be noted that the first data that is obtained by the first network element, that corresponds to the service flow and that is on each of the network elements and may alternatively be sent from an operation, administration and maintenance network element to the first network element. Specifically, when determining that the first data that corresponds to the service flow and that is on each of the network elements needs to be reported, the respective network elements send the first data that corresponds to the service flow and that is on the respective network elements to the operation, administration and maintenance network element, so that the operation, administration and maintenance network element sends the first data to the first network element.

In Table 5, an example in which the first network element correlates all first data on the network element 1 with all first data on the network element 2 to obtain the second data is used. It may be understood that, in an actual process, if the first data on the network element 1 further includes a timestamp, the first network element may select to classify only at least a part of the first data that corresponds to the service flow and that is on the network element 1 and all or at least a part of the data that corresponds to the service flow and that is on the network element 2 into one set, to obtain the second data. Alternatively, in this embodiment of this application, the following case may exist. The first network element obtains, from the at least two network elements, different first data that corresponds to the service flow and that is on different network elements, but the first network element may classify, according to a requirement of the first network element, all or a part of first data that is on some of the at least two network elements into a same set, to obtain the second data. This is not limited in this embodiment of this application.

This embodiment of this application provides a data processing method. The first network element obtains first data that is of a service flow and that is on different network elements, and correlates the first data that is of the service flow and that is on the different network elements based on first identifiers in the first data sent from the different network elements, to obtain second data. In this way, the first network element can subsequently plan one or more sets of QoS parameters of a service to which the service flow belongs, a user plane path corresponding to a session to which the service flow belongs, slice resource optimization, control-plane or user-plane abnormality detection, and the like.

Figure 5:
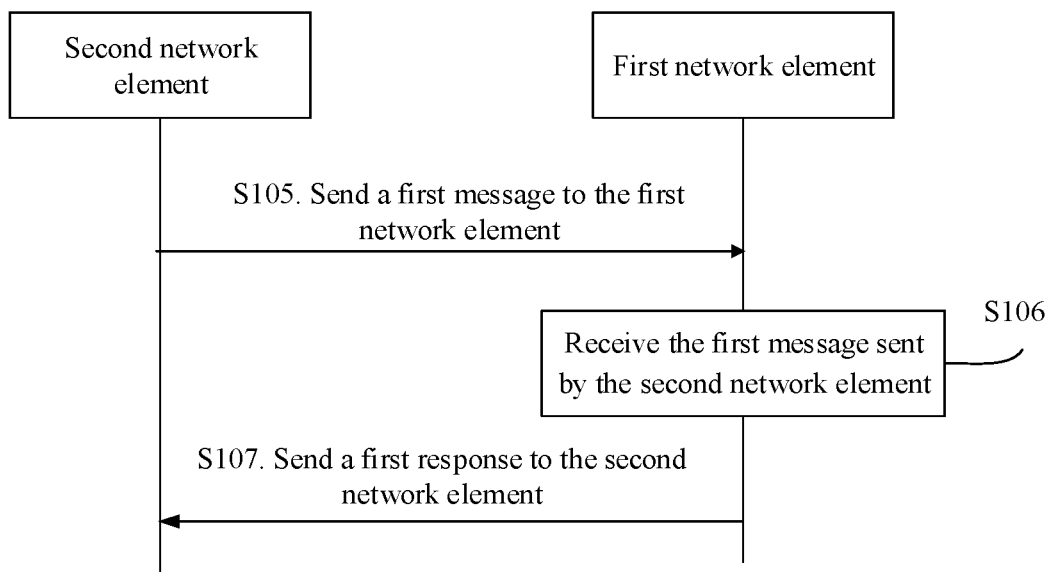

In an actual process, if a second network element finds that some services corresponding to some terminal types, in some network areas, or in some time periods have a problem, to enable the first network element to analyze a cause of the problem, the second network element may propose, to the first network element, a requirement for analyzing the cause. The first network element collects first data that corresponds to the service flow and that is from different network elements. Therefore, in another embodiment, as shown in FIG. 5, the method provided in this embodiment of this application further includes the following steps.

S105. The second network element sends a first message to the first network element, where the first message is used to instruct the first network element to obtain, from the at least two network elements, the first data corresponding to the service flow, and the first message includes one or more of the following information: the identifier of the service to which the service flow belongs, a terminal type of the terminal corresponding to the service flow, a network area in which the terminal corresponding to the service flow is located, and a time window corresponding to the service flow.

Optionally, the first message may further carry identifiers of the at least two network elements and an identifier of the second network element.

Optionally, the first message may further include one or more of the following information: one or more other services identifiers different from the identifier of the service to which the service flow belongs, one or more other terminal types different from the terminal type of the terminal corresponding to the service flow, one or more other network areas different from the network area in which the terminal corresponding to the service flow is located, and one or more other time windows different from the time window corresponding to the service flow.

The identifier of the service to which the service flow belongs is used to determine the service to which the service flow belongs. The terminal type of the terminal corresponding to the service flow is used to determine the terminal type corresponding to the service flow. The time window corresponding to the service flow is used to determine a time period list corresponding to the service flow, for example, from Mar. 1, 2018 to Mar. 8, 2018. The network area in which the terminal corresponding to the service flow is located is used to determine a network area (for example, a tracking area (TA), a TA list, a routing area (RA), or an RA list) corresponding to the service flow.

For example, the second network element may be an AF network element, and the first network element may be an NWDAF network element. For example, the AF may send the first message to the NWDAF network element by using a PCF network element.

The first message may be a message newly defined between the first network element and the second network element, or may be a message existing between the first network element and the second network element. This is not limited in this embodiment of this application. For example, the first message may be an Naf_DataCollection-Condition_Notify message.

S106. The first network element receives the first message sent from the second network element.

It may be understood that after receiving the first message, the first network element may determine that first data corresponding to the service flow needs to be collected from different network elements.

Optionally, in this embodiment of this application, after step S106, the method may further include: S107. The first network element sends a first response to the second network element, where the first response is used to indicate that the first network element has received the first message.

It may be understood that the foregoing steps S105 to S107 may be implemented separately, or may be implemented in combination with the foregoing steps S101 to S104. When steps S105 to S107 are implemented in combination with S101 to S104, S105 to S107 may be implemented before step S101.

Figure 6:
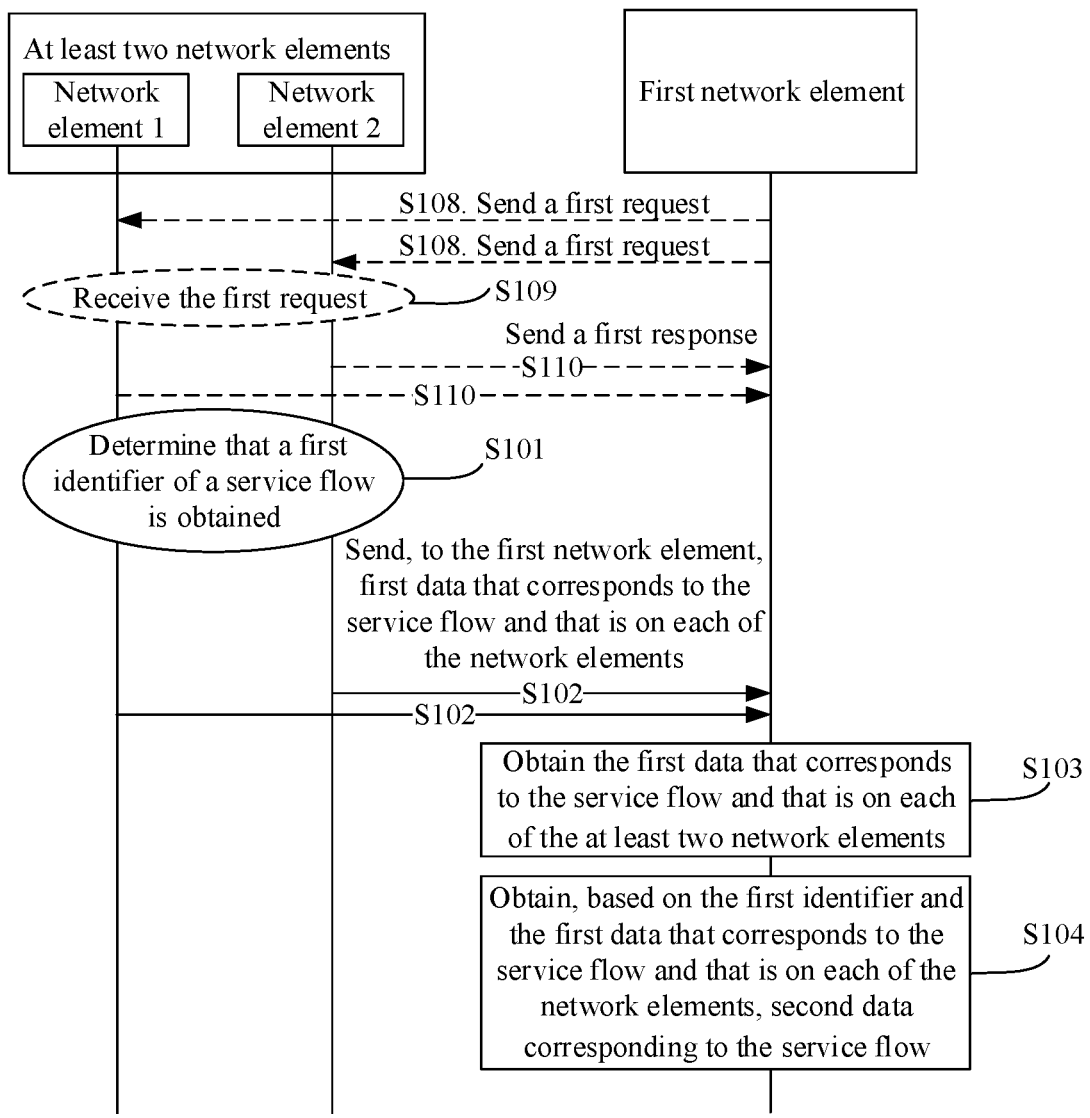

In another embodiment of this application, as shown in FIG. 6, the method provided in this application further includes the following steps.

S108. The first network element sends a first request to each of the at least two network elements, where the first request is used to request the first data that corresponds to the service flow and that is on each of the network elements, and the first request includes one or more of the following information: the identifier of the service to which the service flow belongs, the terminal type of the terminal corresponding to the service flow, the network area in which the terminal corresponding to the service flow is located, and the time window corresponding to the service flow.

Optionally, the first message may further include one or more of the following information: one or more other services identifiers different from the identifier of the service to which the service flow belongs, one or more other terminal types different from the terminal type of the terminal corresponding to the service flow, one or more other network areas different from the network area in which the terminal corresponding to the service flow is located, and one or more other time windows different from the time window corresponding to the service flow.

Because network elements are different, messages used by the first network element to send the first request to the network elements are also different. Therefore, descriptions are provided separately in the following embodiment.

Case 1. When the network element is a PCF network element, the first request sent from the first network element to the network element may be an Npcf_NetworkDataCollectionSubscription request message.

Case 2. When the network element is an AF network element, the first request sent from the first network element to the network element may be an Naf_ServiceDataCollectionSubsctiption request message.

It should be noted that when the network element is a PCF network element or an AF network element, the network element to which the first network element sends the first request and the network element that sends the first message may be a same network element, or may be different network elements. For example, an AF1 network element sends the first message to the first network element, but the first network element requests, from an AF2 network element, first data corresponding to the service flow.

S109. The at least two network elements receive the first request sent from the first network element.

Optionally, in this embodiment of this application, after step S109, the method may further include: S110. Each of the at least two network elements sends, to the first network element, a second response for the first request, where the second response is used to indicate that the network element receives the first request. For example, when the network element is an AF network element, the second response is an Naf_ServiceDataCollectionSubsctiption Response message. When the network element is a PCF network element, the second response is an Npcf_NetworkDataCollectionSubscription Response message.

Optionally, in this embodiment of this application, after S109, the method may further include: S111. The at least two network elements send a second message to the first network element, where the second message carries the first data that corresponds to the service flow and that is on the respective network elements. S112. The first network element receives the second message sent from the at least two network elements. Based on steps S111 and S112, step S103 in this application is implemented in the following manner: The first network element obtains, from the second message sent from each of the network elements, the first data that corresponds to the service flow and that is on each of the network elements.

Optionally, in this embodiment of this application, the first data sent from each of the network elements to the first network element further includes one or more of the following information: an identifier of a network element to which the first data corresponding to the service flow belongs, the identifier of the terminal, and a data value of at least one data type of at least one of the at least two network elements.

For example, the first data is sent from the AF network element to the first network element, and the first data sent from the AF network element to the first network element further carries an identifier of the AF network element.

For the data value of the at least one data type of the at least one of the at least two network elements, first data sent from the network element to the first network element may carry a data value of a data type of the network element, or first data sent from the network element to the first network element may not only carry a data value of a data type of the network element but also carry a data value of a data type of one or more other network elements different from the network element in the at least two network elements. For example, the first data sent from the AF network element to the first network element may carry a data value of a data type of the AF network element and a data value of a data type of the PCF network element.

Figure 7:
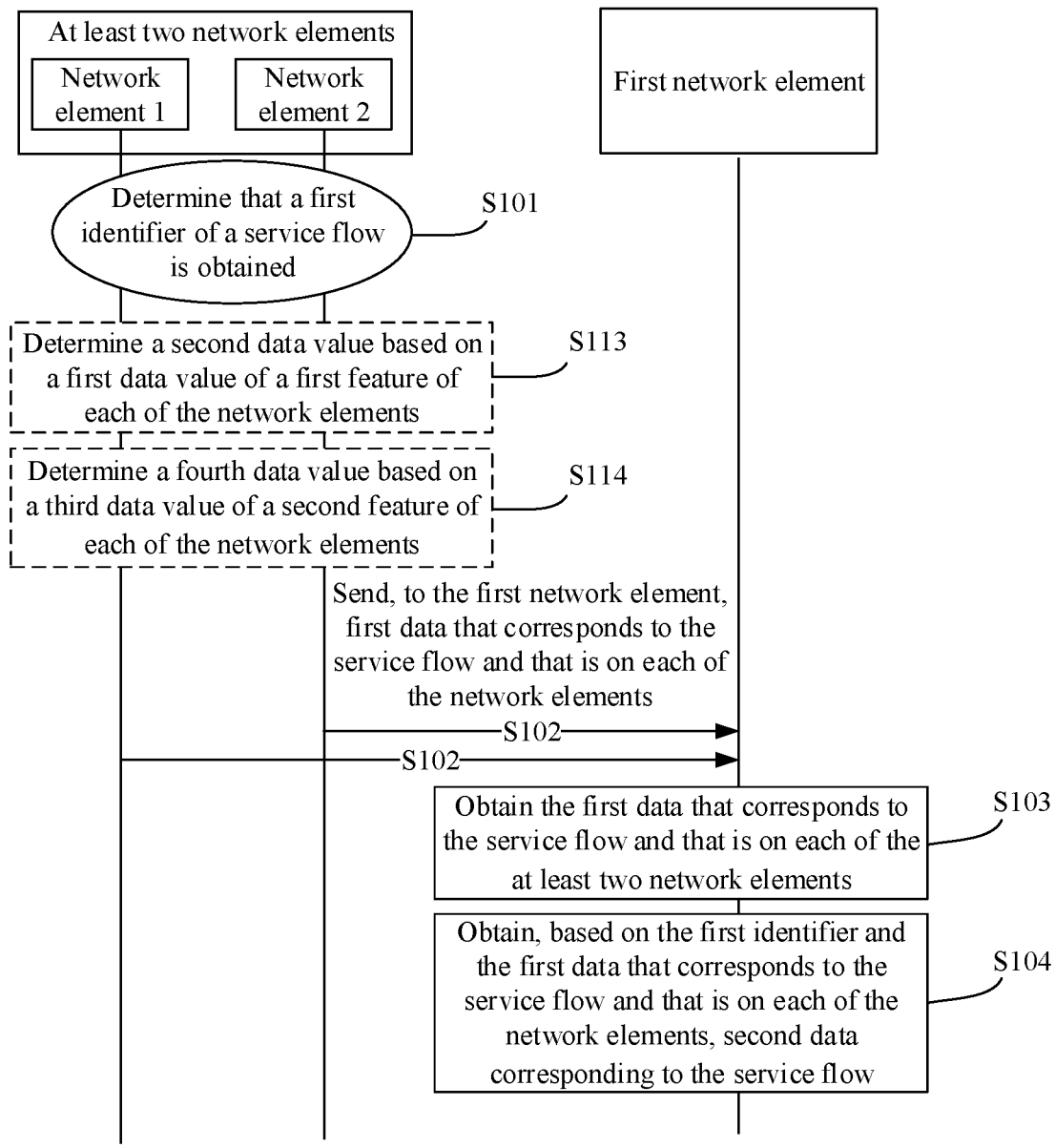

Optionally, as shown in FIG. 7, in this embodiment of this application, before any one of the at least two network elements sends, to the first network element, the first data that corresponds to the service flow and that is on the network element, the method may further include the following steps, to performing normalization processing on the first data to obtain a data value of a respective data type of each network element:

S113. Each of the at least two network elements determines a second data value based on a first data value of a first data type of the network element, where the first data value belongs to a first value space, the second data value belongs to a second value space, and the first data type is any entry in the first data.

Further, to perform normalization processing on the first data that is of the service flow and that is on the network element, after step S113, the method may further include the following step:

S114. Each network element determines a fourth data value based on a third data value of a second data type of the network element, where the third data value belongs to a third value space, the fourth data value belongs to a fourth value space, and the second data type is any entry in the first data.

Optionally, the second value space is the same as the fourth value space. To facilitate processing by the first network element, a normalized space is the same for all data types, and the NWDAF does not need to further normalize the first data to a same value space.

Optionally, the performing normalization processing on the first data to obtain a data value of a respective data type of each network element may further include: each of the at least two network elements determines a sixth data value according to a fifth data value of a third data type of each network element, where the fifth data value belongs to a fifth data value space, and the sixth data value belongs to a sixth value space.

Optionally, the second value space is the same as the sixth value space.

Through normalization processing, each of the at least two network elements may determine the second data value based on the first data value of the first data type of each network element, or determine the fourth data value based on the third data value of the second data type of each network element, or determine the sixth data value based on the fifth data value of the third data type of each network element. The normalization processing includes mapping a physical data value of a data type to a fixed value space. The normalization processing is mainly to map a physical data value of each data type to a fixed value space by using a maximum minimum value normalization method, a Z-Score normalization method, or the like. This processing not only facilitates improvement of a model training convergence speed in a big data analysis process, but also provides a feature data transmission manner.

Because the at least two network elements may be any two different network elements of an AMF network element, a terminal, an SMF network element, a PCF network element, and an AF network element, when the first data corresponding to the service flow comes from any one of the AMF network element, the terminal, the SMF network element, the PCF network element, and the AF network element, the first data is different. Therefore, an example in which the at least two network elements include a third network element is used below to separately describe some information that first data obtained from the third network element may further have when the third network element is an AMF network element, a terminal, an SMF network element, a PCF network element, and an AF network element.

When the third network element is an application function AF network element, the first data obtained from the third network element further includes one or more of the following information: the identifier of the service to which the service flow belongs, a communication pattern parameter of the service to which the service flow belongs, flow bit rate data of a first interface, latency data of the first interface, packet loss rate data of the first interface, packet data of the first interface, a timestamp, experience data of the service to which the service flow belongs, jitter buffer data, transmission control protocol TCP congestion window data, TCP receive window data, media encoding type data, and encoding rate data of the media encoding type data. The first interface is an interface between a user plane function network element and a data network DN that corresponds to the AF network element. For example, as shown in FIG. 3, the first interface may be an N6 interface.

When the third network element is a policy control function PCF network element, the first data obtained from the third network element further includes one or more of the following information: the identifier of the service to which the service flow belongs, an identifier of a session to which the service flow belongs, a data network name DNN of the session to which the service flow belongs, identification information of a slice to which the service flow belongs, IP filtering information, a media bandwidth requirement, traffic routing information, a jitter buffer requirement, a TCP congestion window requirement, a TCP receive window requirement, a media encoding type requirement, an encoding rate requirement in the media encoding type requirement, and a validity time window of the identifier of the service.

When the third network element is an SMF network element, the first data obtained from the third network element further includes one or more of the following information: an identifier of the service flow, an identifier of a session to which the service flow belongs, a DNN of the session to which the service flow belongs, identification information of a slice to which the service flow belongs, and a validity time window of the identifier of the service flow.

When the third network element is a first UPF network element, the first data obtained from the third network element further includes one or more of the following information: an identifier of the service flow, a timestamp, flow bit rate data of a second interface, flow bit rate data of a first interface, bit rate data of a third interface, latency data of the second interface, latency data of the first interface, latency data of the third interface, packet loss rate data of the first interface, packet loss rate data of the second interface, packet loss rate data of the third interface, packet data of the first interface, packet data of the second interface, and packet data of the third interface. The second interface is an interface between the first UPF network element and a RAN device. The third interface is an interface between the first UPF network element and a second UPF network element. For example, the second interface may be the N3 interface shown in FIG. 3, and the third interface is an N9 interface.

When the third network element is an access and mobility management AMF network element, the first data obtained from the third network element further includes at least one of the following information: location information of the terminal corresponding to the service flow, an identifier of a session to which the service flow belongs, a DNN of the session to which the service flow belongs, identification information of a slice to which the service flow belongs, and a validity time window of the identifier of the session to which the service flow belongs.

When the third network element is a RAN device, the first data obtained from the third network element further includes one or more of the following information: location information of the terminal corresponding to the service flow, an identifier of the service flow, an identifier of a session to which the service flow belongs, identification information of a slice to which the service flow belongs, a timestamp, flow bit rate data of a fourth interface, flow bit rate data of a second interface, latency data of the second interface, latency data of the fourth interface, reference signal received power RSRP data, reference signal received quality RSRQ data, signal to interference plus noise ratio (SINR) data, CQI data, BLER data, a congestion level, packet loss rate data of the second interface, packet loss rate data of the fourth interface, packet data of the second interface, and packet data of the fourth interface. The fourth interface is an interface between the RAN device and the terminal, for example, the Uu interface shown in FIG. 3.

When the network element is a terminal, the first data obtained from the third network element further includes one or more of the following information: location information of the terminal corresponding to the service flow, an identifier of the service flow, an identifier of a session to which the service flow belongs, a DNN of the session to which the service flow belongs, identification information of a slice to which the service flow belongs, flow bit rate data of a fourth interface, latency data of the fourth interface, packet loss rate data of the fourth interface, packet data of the fourth interface, a timestamp, service experience data, jitter buffer data, transmission control protocol TCP congestion window data, TCP receive window data, media encoding type data, encoding rate data of the media encoding type data, RSRP data, RSRQ data, SINR data, CQI data, and BLER data.

Figure 8:
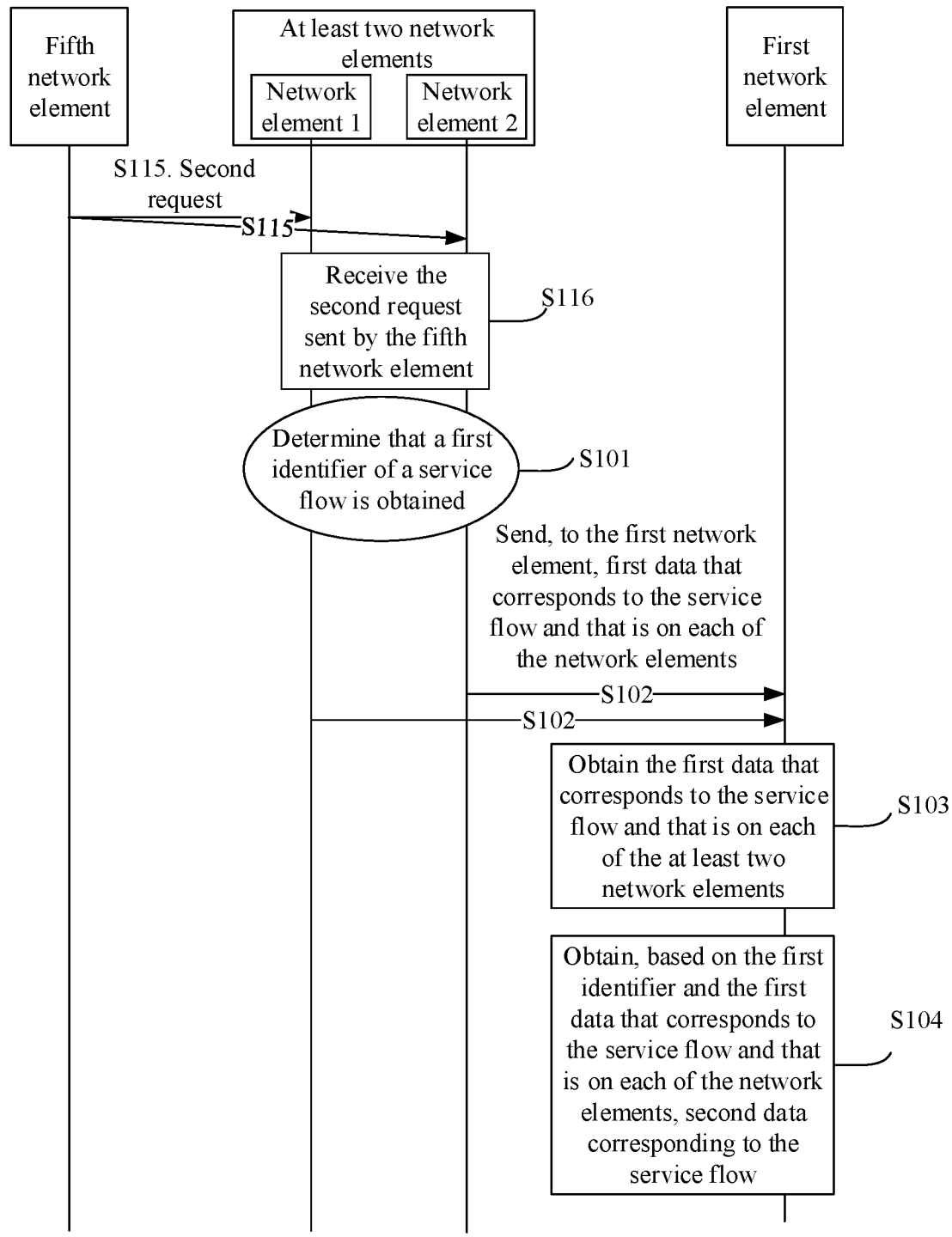

In still another embodiment of this application, as shown in FIG. 8, the method provided in this embodiment of this application further includes the following steps.

S115. A fifth network element sends a second request to the at least two network elements, where the second request is used to request to establish the service flow, and the second request includes one or more of the following information: the identifier of the service to which the service flow belongs, the IP filtering information, the media bandwidth requirement, the traffic routing information, the jitter buffer requirement, the TCP congestion window requirement, the TCP receive window requirement, the media encoding type requirement, and the encoding rate requirement in the media encoding type requirement.

For example, the fifth network element may be an AF network element.

Optionally, if one of the at least two network elements is a PCF network element, and the AF network element is a 3rd-party AF network element, the second request may be exchanged between the 3rd-party AF network element and the PCF network element by using the NEF network element.

For example, the second request may be an Npcf_PolicyAuthorization_Create Request message.

S116. The at least two network elements receive the second request sent from the fifth network element.

Figure 9:
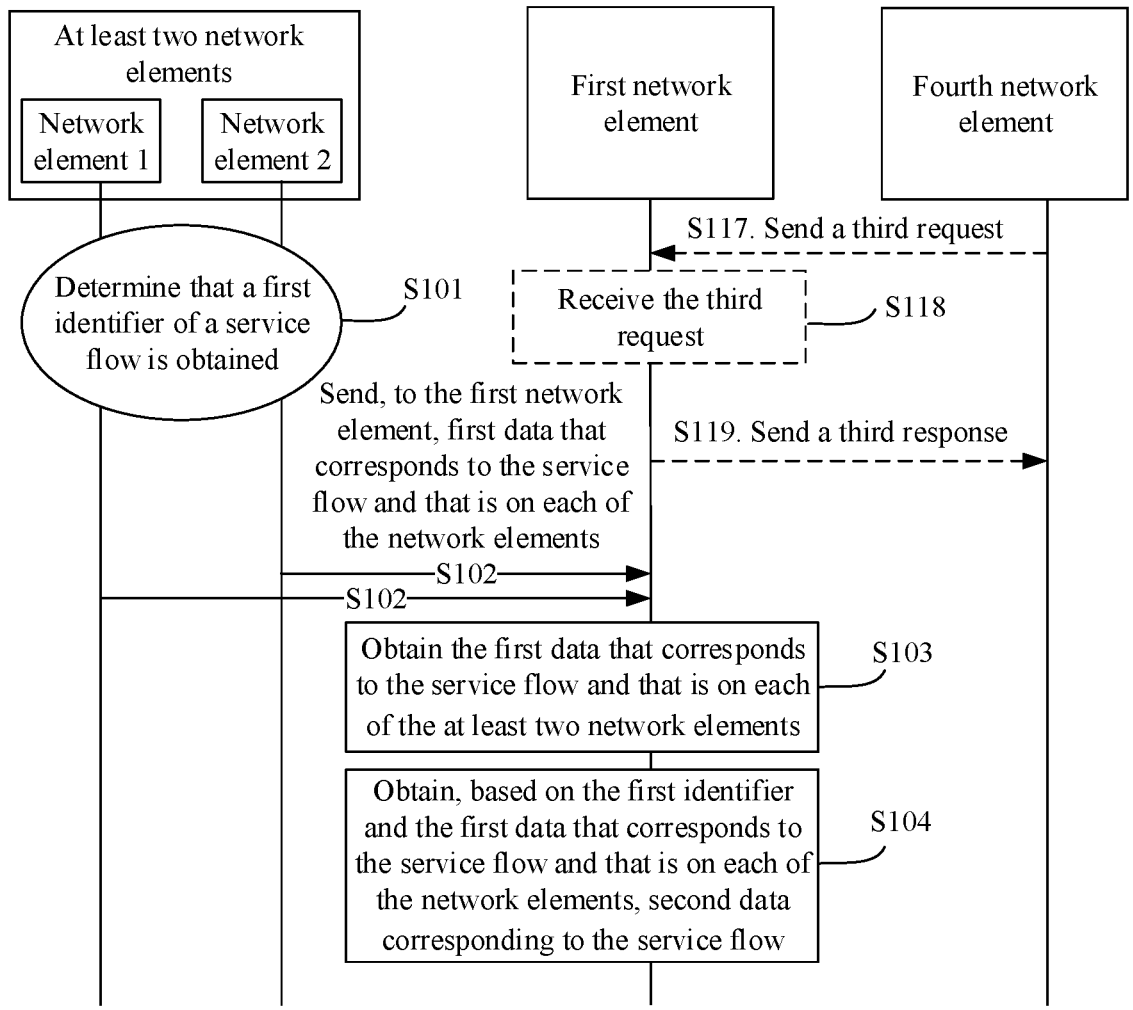

Optionally, as shown in FIG. 9, the method provided in this embodiment of this application further includes the following steps.

S117. The fourth network element sends a third request to the first network element, where the third request is used to request to allocate the first identifier to the service flow.

For example, the fourth network element may be a PCF network element or an SMF network element.

For example, the third request may be an Nnwaf_CorrelationIDAssignment Request message.

For example, the third request may carry the identifier of the service to which the service flow belongs, the identifier of the session to which the service flow belongs, and the identifier of the terminal corresponding to the service flow.

Optionally, one request may be used to request correlation ID lists corresponding to a plurality of SDFs in one PDU session.

S118. The first network element receives the third request sent from the fourth network element.

S119. The first network element sends a third response to the third network element, where the third response includes the first identifier.

For example, the third response may be an Nnwdaf_CorrelacationIDAssignment Response message.

Figure 10:
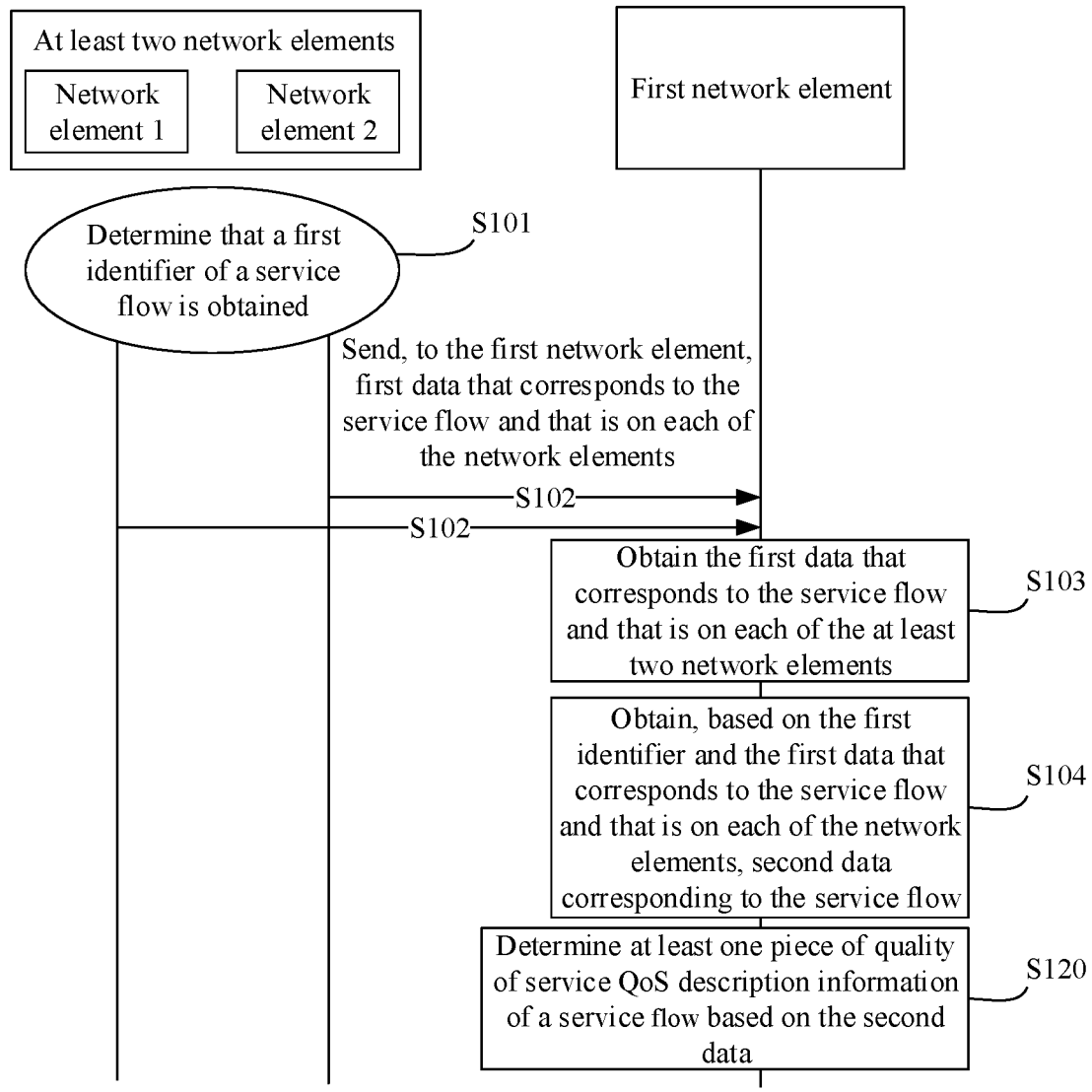

Optionally, in another embodiment of this application, as shown in FIG. 10, after step S104, the method may further include the following step:

S120. The first network element determines at least one piece of quality of service QoS description information of the service based on the second data, where each of the at least one piece of QoS description information includes a QoS parameter type and/or a QoS parameter requirement.

Optionally, each of the at least one piece of QoS description information further includes network element information, and the network element information is used to indicate a network element corresponding to the QoS parameter requirement.

Optionally, step S101 in this embodiment of this application may be implemented in the following manner:

Case 1: When the network element is a PCF network element, the network element sends a third request to a server network element, where the third request is used to request the first identifier, and the third request includes the identifier of the service and the identifier of the terminal. The network element receives a third response from the server network element, where the third response includes the first identifier. For example, the server network element may be a data analysis network element, a network repository function network element, or a domain name server.

Case 2: When the network element is an AF network element, after the AF network element sends a second request to a PCF network element, the AF network element may obtain the first identifier from a second response that is sent from the PCF network element in response to the second request.

Case 3: If the network element is an SMF network element, the SMF network element may obtain the first identifier from a PCF network element. For example, the PCF network element may send the first identifier corresponding to the service flow to the SMF network element by using an Npcf_SMPolicyControl_UpdateNotify request message.

Case 4: When the network element is a UPF network element, after an SMF network element receives the first identifier, the SMF network element may send the first identifier to the UPF network element. For example, the SMF network element may send the first identifier corresponding to the service flow to the UPF network element by using an N4 Session Modification Request/Response, namely, an N4 session modification procedure. In other words, the UPF network element may obtain the first identifier from the SMF network element by using the N4 session modification procedure.

Case 5: When the network element is an AMF network element, specifically, after an SMF network element obtains the first identifier, the SMF network element may send the first identifier to the AMF network element. In other words, the AMF network element may obtain the first identifier from the SMF network element. It may be understood that, the case 5 alternatively includes a process in which a PCF network element sends the first identifier to the AMF network element by using an SMF network element.

For example, the SMF network element may send the first identifier to the AMF network element by using an Namf_Communication_N1N2MessageTransfer message.

Case 6: When the network element is a RAN device, the RAN device receives the first identifier sent from an AMF network element or an SMF network element. In other words, after the AMF network element or the SMF network element has the first identifier, the AMF network element or the SMF network element may send the first identifier to the RAN device. For example, the AMF network element may send the first identifier to the RAN device by using an N2 session request. It may be understood that, the case 6 alternatively includes: a PCF network element sends the first identifier to the RAN device by using an AMF network element or an SMF network element.

Case 7: When the network element is a terminal, the terminal receives the first identifier sent from a RAN device, an AMF network element, or an SMF network element. In other words, after having the first identifier, the RAN device, the AMF network element, or the SMF network element may send the first identifier to the terminal. Alternatively, a PCF network element may send the first identifier to the terminal by using an AMF network element, an SMF network element, or a RAN device.

The foregoing describes the solutions in the embodiments of this application mainly from a perspective of interaction between network elements. It may be understood that each network element, such as a data processing apparatus or a data sending apparatus, includes a corresponding hardware structure and/or software module for performing each function, to implement the foregoing functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Division of the data processing apparatus and the data sending apparatus into functional units may be performed according to the foregoing method examples in the embodiments of this application. For example, each functional unit may be obtained through division according to each function, or two or more functions may be integrated into one processing unit. The integrated unit may be implemented in a form of hardware, or may be implemented in a form of a software functional unit. It should be noted that, in this embodiment of this application, unit division is exemplary, and is merely a logical function division. In actual implementation, another division manner may be used.

Figure 11:
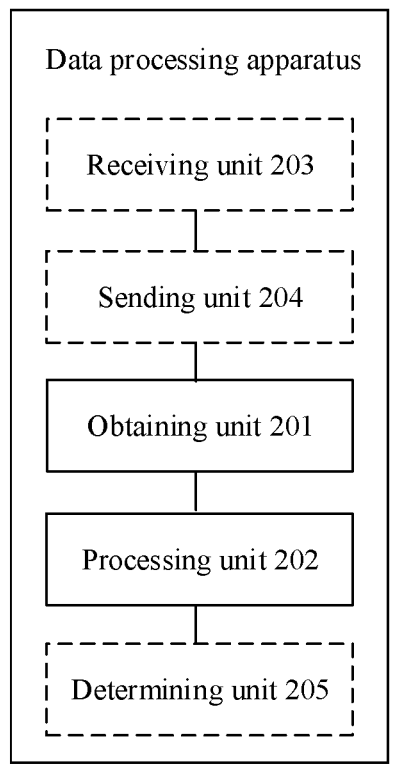
FIG. 11 to FIG. 13 are schematic structural diagrams of a data processing apparatus according to embodiments of this application.

When an integrated unit is used, FIG. 11 shows a possible schematic structural diagram of a data processing apparatus in the foregoing embodiments. The data processing apparatus may be a first network element, or a chip applied to the first network element. The data processing apparatus includes an obtaining unit 201 and a processing unit 202. The obtaining unit 201 is configured to support the data processing apparatus in performing step S103 in the foregoing embodiments. The processing unit 202 is configured to support the data processing apparatus in performing step S104 in the foregoing embodiments. Optionally, the data processing apparatus further includes a receiving unit 203, a sending unit 204, and a determining unit 205. The receiving unit 203 is configured to support the data processing apparatus in performing steps S106 and S118 in the foregoing embodiments. The sending unit 204 is configured to support the data processing apparatus in performing steps S107, S108, S119, and S112 in the foregoing embodiments. The determining unit 205 is configured to support the data processing apparatus in performing step S110 in the foregoing embodiments. All related content of the steps in the foregoing method embodiments may be cited in function descriptions of the corresponding function modules. Details are not described herein again.

Figure 12:
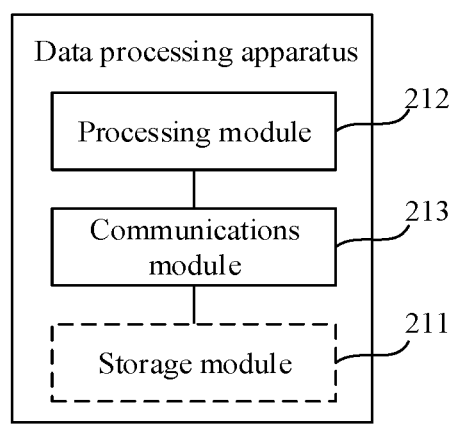

When an integrated unit is used, FIG. 12 shows a possible schematic diagram of a logical structure of a data processing apparatus in the foregoing embodiments. The data processing apparatus may be the first network element in the foregoing embodiments, or a chip applied to the first network element. The data processing apparatus includes a processing module 212 and a communications module 213. The processing module 212 is configured to control and manage an action of the data processing apparatus. For example, the processing module 212 is configured to perform a message or data processing step performed on the data processing apparatus side, for example, support the data processing apparatus in performing S104 and S110 in the foregoing embodiments. The communications module 213 is configured to support the data processing apparatus in performing S103, S107, S108, S119, and S112 in the foregoing embodiments, and/or is configured to perform another process performed by the data processing apparatus in the technology described in this specification.

Optionally, the data processing apparatus may further include a storage module 211, configured to store program code and data of the data processing apparatus.

The processing module 212 may be a processor or controller, for example, the processing module may be a central processing unit, a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of the digital signal processor and a microprocessor. The communications module 213 may be a transceiver, a transceiver circuit, a communications interface, or the like. The storage module 211 may be a memory.

Figure 13:
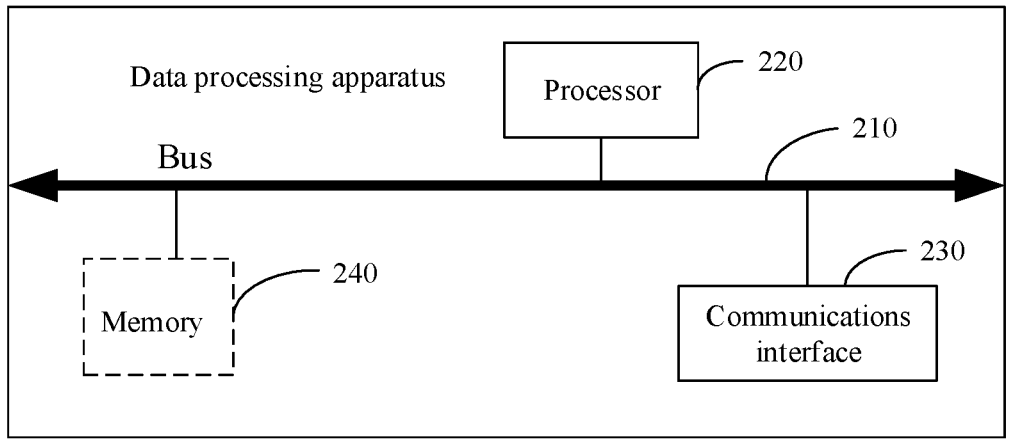

When the processing module 212 is a processor 220, the communications module 213 is a communications interface 230 or a transceiver, and the storage module 211 is a memory 240, the data processing apparatus in this application may be a device shown in FIG. 13.

The communications interface 230, one or more (including two) processors 220, and the memory 240 are connected to each other by using a bus 210. The bus 210 may be a PCI bus, an EISA bus, or the like. The bus may be classified into an address bus, a data bus, a control bus, and the like. For ease of representation, only one thick line is used to represent the bus in FIG. 13, but this does not mean that there is only one bus or only one type of bus. The memory 240 is configured to store program code and data of the data processing apparatus. The communications interface 230 is configured to support the data processing apparatus in communicating with another device (for example, a second network element). The processor 220 is configured to support the data processing apparatus in executing the program code and the data that are stored in the memory 240, to implement S103, S104, S107, S108, S119, S110, and S112 provided in this application.

Figure 14:
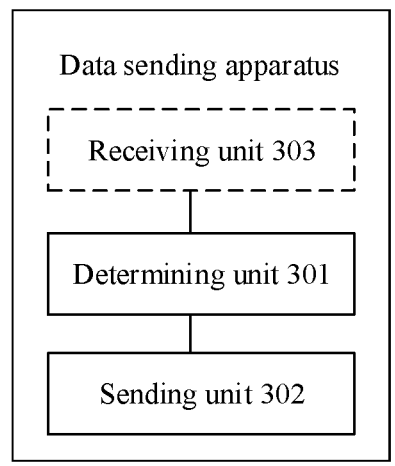
FIG. 14 to FIG. 19 are schematic structural diagrams of a data sending apparatus according to embodiments of this application.

When an integrated unit is used, FIG. 14 shows a possible schematic structural diagram of a data sending apparatus in the foregoing embodiments. The data sending apparatus may be a network element, or a chip in a network element. The data sending apparatus includes a determining unit 301 and a sending unit 302. The determining unit 301 is configured to support the data sending apparatus in performing steps S101, S113, and S114 in the foregoing embodiments. The sending unit 302 is configured to support the data sending apparatus in performing steps S102 and S111 in the foregoing embodiments. Optionally, the data sending apparatus may further include a receiving unit 303, configured to support the data sending apparatus in performing steps S109 and S116 in the foregoing embodiments. All related content of the steps in the foregoing method embodiments may be cited in function descriptions of the corresponding function modules. Details are not described herein again.

Figure 15:
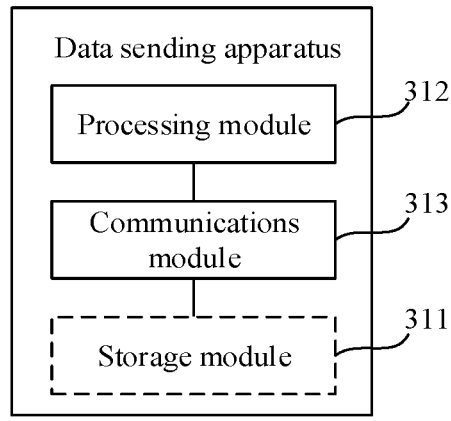

When an integrated unit is used, FIG. 15 shows a possible schematic diagram of a logical structure of a data sending apparatus in the foregoing embodiments. The data sending apparatus may be the network element in the foregoing embodiments, or may be a chip applied to the network element. The data sending apparatus includes a processing module 312 and a communications module 313. The processing module 312 is configured to control and manage an action of the data sending apparatus. For example, the processing module 312 is configured to perform a message or data processing step performed on the data sending apparatus side, for example, S101, S113, and S114. The communications module 313 is configured to support the data sending apparatus in performing S102, S111, S109, and S116 in the foregoing embodiments, and/or is configured to perform another process performed by the data sending apparatus in the technology described in this specification.

Optionally, the data sending apparatus may further include a storage module 311, configured to store program code and data of the data sending apparatus.

The processing module 312 may be a processor or controller, for example, the processing module may be a central processing unit, a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of the digital signal processor and a microprocessor. The communications module 313 may be a transceiver, a transceiver circuit, a communications interface, or the like. The storage module 311 may be a memory.

Figure 16:
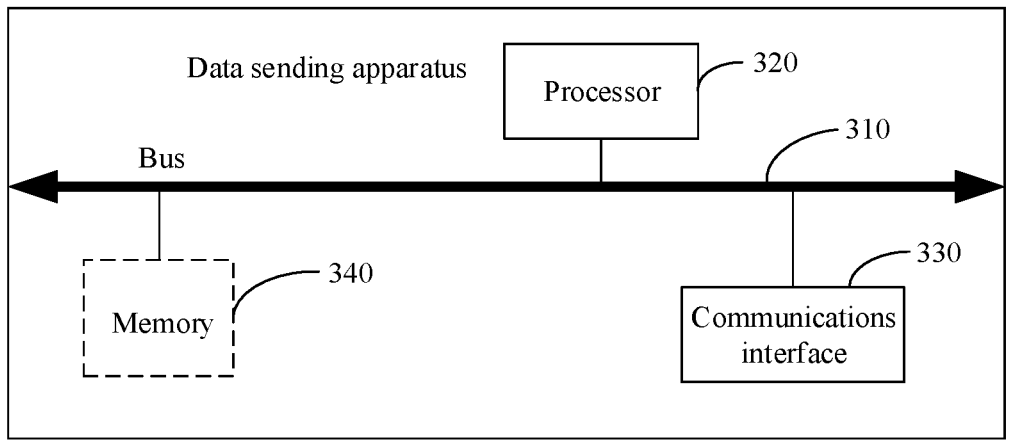

When the processing module 312 is a processor 320, the communications module 313 is a communications interface 330 or a transceiver, and the storage module 311 is a memory 340, the data sending apparatus in this application may be a device shown in FIG. 16.

The communications interface 330, one or more (including two) processors 320, and the memory 340 are connected to each other by using a bus 310. The bus 310 may be a PCI bus, an EISA bus, or the like. The bus may be classified into an address bus, a data bus, a control bus, and the like. For ease of representation, only one thick line is used to represent the bus in FIG. 16, but this does not mean that there is only one bus or only one type of bus. The memory 340 is configured to store program code and data of the data sending apparatus. The communications interface 330 is configured to support the data sending apparatus in communicating with another device (for example, a first network element). The processor 320 is configured to support the data sending apparatus in executing the program code and the data that are stored in the memory 340, to implement S101, S113, S114, S102, S111, S109, and S116 provided in this application.

Figure 17:
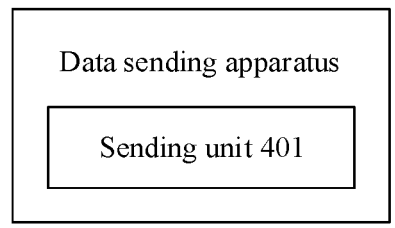

When an integrated unit is used, FIG. 17 shows another possible schematic structural diagram of a data sending apparatus in the foregoing embodiments. The data sending apparatus may be a second network element, or a chip applied to the second network element. The data sending apparatus includes a sending unit 401. The sending unit 401 is configured to support the data sending apparatus in performing S105 in the foregoing embodiments. All related content of the steps in the foregoing method embodiments may be cited in function descriptions of the corresponding function modules. Details are not described herein again.

Figure 18:
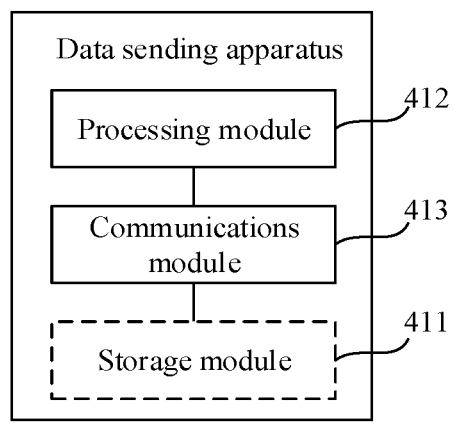

When an integrated unit is used, FIG. 18 is a possible schematic diagram of a logical structure of a data sending apparatus in the foregoing embodiments. The data sending apparatus may be the second network element in the foregoing embodiments, or may be a chip applied to the second network element. The data sending apparatus includes a processing module 412 and a communications module 413. The processing module 412 is configured to control and manage an action of the data sending apparatus. For example, the processing module 412 is configured to perform a message or data processing step performed on the data sending apparatus side, for example, support the data sending apparatus in performing S105 in the foregoing embodiments. The communications module 413 is configured to support the data sending apparatus in performing S105 in the foregoing embodiments, and/or is configured to perform another process performed by the data sending apparatus in the technology described in this specification.

Optionally, the data sending apparatus may further include a storage module 411, configured to store program code and data of the data sending apparatus.

The processing module 412 may be a processor or controller, for example, the processing module may be a central processing unit, a general-purpose processor, a digital signal processor, an application-specific integrated circuit, a field programmable gate array or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of the digital signal processor and a microprocessor. The communications module 413 may be a transceiver, a transceiver circuit, a communications interface, or the like. The storage module 411 may be a memory.

Figure 19:
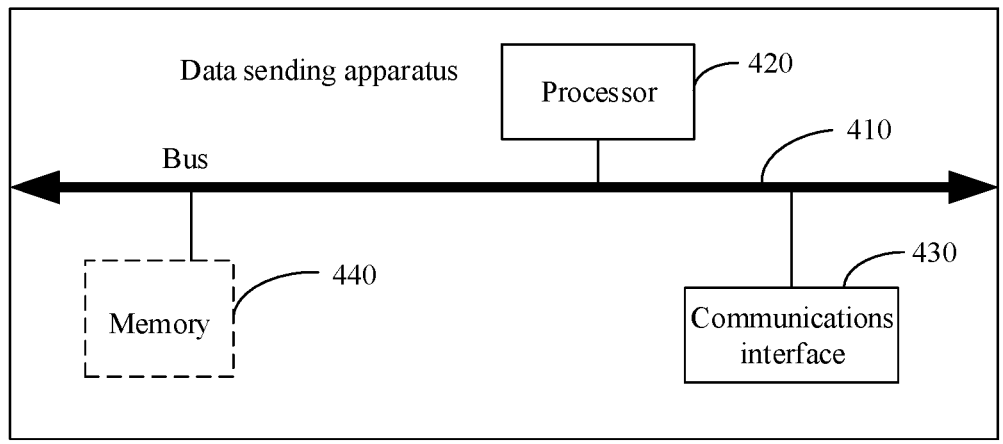

When the processing module 412 is a processor 420, the communications module 413 is a communications interface 430 or a transceiver, and the storage module 411 is a memory 440, the data sending apparatus in this application may be a device shown in FIG. 19.

The communications interface 430, one or more (including two) processors 420, and the memory 440 are connected to each other by using a bus 410. The bus 410 may be a PCI bus, an EISA bus, or the like. The bus may be classified into an address bus, a data bus, a control bus, and the like. For ease of representation, only one thick line is used to represent the bus in FIG. 19, but this does not mean that there is only one bus or only one type of bus. The memory 440 is configured to store program code and data of the data sending apparatus. The communications interface 430 is configured to support the data sending apparatus in communicating with another device. The processor 420 is configured to support the data sending apparatus in executing the program code and the data that are stored in the memory 440, to implement S105 provided in this application.

Figure 20:
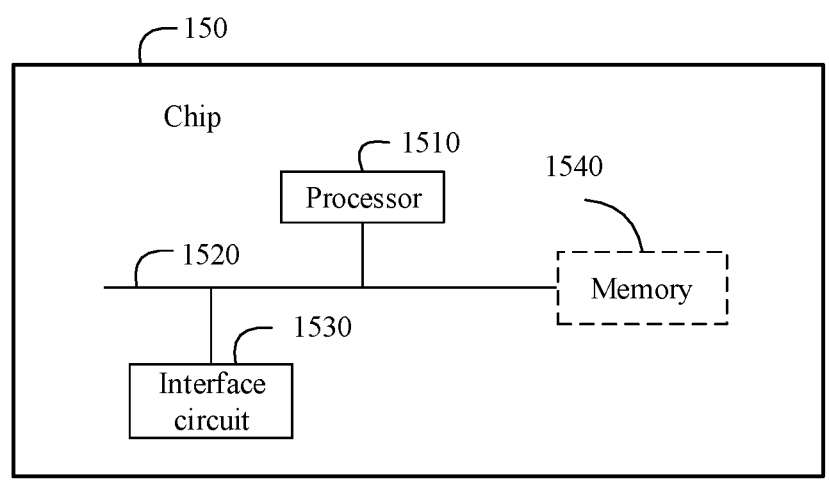
FIG. 20 is a schematic structural diagram of a chip according to an embodiment of this application.

FIG. 20 is a schematic structural diagram of a chip 150 according to an embodiment of the present disclosure. The chip 150 includes one or more (including two) processors 1510 and an interface circuit 1530.

Optionally, the chip 150 further includes a memory 1540. The memory 1540 may include a read-only memory and a random access memory, and provides an operation instruction and data for the processor 1510. A part of the memory 1540 may further include a non-volatile random access memory (NVRAM).

In some implementations, the memory 1540 stores the following elements, an executable module or a data structure, or a subset thereof, or an extended set thereof.

In this embodiment of the present disclosure, a corresponding operation is performed by invoking the operation instruction stored in the memory 1540 (the operation instruction may be stored in an operating system).

A possible implementation is: Structures of chips used by a first network element and a second network element are similar, and different apparatuses may use different chips to implement functions of the apparatuses.

The processor 1510 controls operations of the first network element, and the second network element. The processor 1510 may also be referred to as a central processing unit (CPU). The memory 1540 may include a read-only memory and a random access memory, and provide an instruction and data to the processor 1510. A part of the memory 1540 may further include anon-volatile random access memory (NVRAM). For example, in an application, the processor 1540, the interface circuit 1530, and the memory 1540 are coupled together by using a bus system 1520, where the bus system 1520 may further include a power bus, a control bus, a status signal bus, and the like in addition to a data bus. However, for clear description, various types of buses in FIG. 20 are marked as the bus system 1520.

The methods disclosed in the foregoing embodiments of the present disclosure may be applied to the processor 1510, or implemented by the processor 1510. The processor 1510 may be an integrated circuit chip and has a signal processing capability. In an implementation process, steps in the foregoing methods can be implemented by using a hardware integrated logical circuit in the processor 1510, or by using instructions in a form of software. The processor 1510 may be a general purpose processor, a digital signal processor (DSP), an application specific integrated circuit (ASIC), a field-programmable gate array (FPGA) or another programmable logical device, a discrete gate or transistor logic device, or a discrete hardware component. It may implement or perform the methods, the steps, and logical block diagrams that are disclosed in the embodiments of the present disclosure. The general purpose processor may be a microprocessor, or the processor may be any conventional processor or the like. Steps of the methods disclosed with reference to the embodiments of the present disclosure may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1540, and the processor 1510 reads information in the memory 1540 and completes the steps in the foregoing methods in combination with hardware of the processor.

Optionally, the interface circuit 1530 is configured to perform receiving and sending steps of the first network element, and the second network element in the embodiments shown in FIG. 4, FIG. 5, FIG. 6, FIG. 7, FIG. 8, FIG. 9, and FIG. 10.

The processor 1510 is configured to perform processing steps of the first network element, and the second network element in the embodiments shown in FIG. 4, FIG. 5, FIG. 6, FIG. 7, FIG. 8, FIG. 9, and FIG. 10.

In the foregoing embodiments, the instruction that is stored in the memory and that is to be performed by the processor may be implemented in a form of a computer program product. The computer program product may be written in the memory in advance, or may be downloaded and installed in the memory in a form of software.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk, SSD), or the like.

According to an aspect, a computer storage medium is provided. The computer-readable storage medium stores an instruction. When the instruction is run, a first network element or a chip applied to a first network element is enabled to perform S103, S104, S107, S108, S119, S110, and S112 in the embodiments, and/or is configured to perform another process performed by the first network element or the chip applied to the first network element in the technology described in this specification.

According to another aspect, a computer storage medium is provided. The computer-readable storage medium stores an instruction. When the instruction is run, a network element or a chip applied to a network element is enabled to perform S101, S113 and S114, S102, S111, S109, and S116 in the embodiments, and/or is configured to perform another process performed by the network element or the chip applied to the network element in the technology described in this specification.

According to still another aspect, a computer storage medium is provided. The computer-readable storage medium stores an instruction, and when the instruction is run, a second network element or a chip applied to a second network element is enabled to perform S105 in the embodiment, and/or is configured to perform another process performed by the second network element or the chip applied to the second network element in the technology described in this specification.

The foregoing readable storage medium may include: any medium that can store program code, such as a removable hard disk, a read-only memory, a random access memory, a magnetic disk, or an optical disc.

According to an aspect, a computer program product including an instruction is provided. The computer program product stores the instruction. When the instruction is run, a first network element or a chip applied to a first network element is enabled to perform S103, S104, S107, S108, S119, S110, and S112 in the embodiments, and/or is configured to perform another process performed by the first network element or the chip applied to the first network element in the technology described in this specification.

According to another aspect, a computer program product including an instruction is provided. The computer program product stores the instruction. When the instruction is run, a network element or a chip applied to a network element is enabled to perform S101, S113, S114, S102, S111, S109, and S116 in the embodiments, and/or is configured to perform another process performed by the network element or the chip applied to the network element in the technology described in this specification.

According to still another aspect, an embodiment of this application provides a computer program product including an instruction. The computer program product stores the instruction. When the instruction is run, a second network element or a chip in a second network element is enabled to perform S105 in the embodiments, and/or is configured to perform another process performed by the second network element or the chip applied to the second network element in the technology described in this specification.

According to an aspect, a chip is provided. The chip is applied to a first network element. The chip includes one or more (including two) processors and an interface circuit. The interface circuit and the one or more (including two) processors are interconnected by using a line. The processor is configured to: run an instruction to perform S103, S104, S107, S108, S119 and S110, S112 in the embodiments, and/or is configured to perform another process performed by the first network element in the technology described in this specification.

According to another aspect, a chip is provided. The chip is applied to a network element. The chip includes one or more (including two) processors and an interface circuit. The interface circuit and the one or more (including two) processors are interconnected by using a line. The processor is configured to run an instruction to perform S101, S113 and S114, S102, S111, S109, and S116 in the embodiments, and/or perform another process performed by the network element in the technology described in this specification.

According to still another aspect, a chip is provided. The chip is applied to a second network element. The chip includes one or more (including two) processors and an interface circuit. The interface circuit and the one or more (including two) processors are interconnected by using a line. The processor is configured to run an instruction to perform S105 in the embodiments, and/or is configured to perform another process performed by the second network element in the technology described in this specification.

In addition, this application further provides a data processing system. The data processing system includes the data processing apparatus shown in FIG. 11 to FIG. 13 and the data sending apparatus shown in FIG. 14 to FIG. 16.

Optionally, the data processing system further includes the data sending apparatus shown in FIG. 17 to FIG. 19.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD, or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A data processing method, comprising:
receiving, by a first network element, a message from a second network element, wherein the message instructs the first network element to obtain data corresponding to a service flow, the message comprises an identifier of a service to which the service flow belongs, wherein the first network element is a network data analytics function (NWDAF) network element;
sending, by the first network element, a first request message to an application function (AF) network element, wherein the first request message requests the service data and the first request message comprises the identifier of the service;
receiving, by the first network element from the AF network element, service data that corresponds to the service flow and that is on the AF network element, wherein the service data comprises a first identifier;
sending, by the first network element, a second request message to a third network element, wherein the second request message requests network data and the second request message comprises the identifier of the service;
receiving, by the first network element from the third network element, the network data that corresponds to the service flow and that is on the third network element, the network data comprises a second identifier;
correlating, by the first network element based on a mapping relationship between the first identifier and the second identifier, the service data and the network data to obtain training data of the service flow; and
performing, by the first network element based on the training data, one of user-plane or control-plane fault diagnosis.

2. The method according to claim 1, wherein the service data further comprises at least one of: flow bit rate data of a first interface, latency data of the first interface, and packet loss rate data of the first interface, wherein the first interface is an interface between a user plane function (UPF) network element and a data network (DN) that corresponds to the AF network element.

3. The method according to claim 1, wherein the third network element is a UPF network element, the network data further comprises at least one of: flow bit rate data of a second interface, latency data of the second interface, and packet loss rate data of the second interface, wherein the second interface is an interface between the UPF network element and a radio access network RAN device.

4. The method according to claim 1, wherein the third network element is a RAN device, the network data further comprises at least one of: flow bit rate data of a fourth interface, latency data of the fourth interface, and packet loss rate data of the fourth interface, wherein the fourth interface is an interface between the RAN device and a terminal.

5. A network data analytics function (NWDAF) network element, comprising:
a non-transitory memory storing instructions; and
at least one processor coupled to the non-transitory memory, wherein the at least one processor is configured to execute instructions stored in the memory, to cause the NWDAF network element to perform operations comprising:
receiving a message from a second network element, wherein the message instructs the NWDAF network element to obtain data corresponding to a service flow, the message comprises an identifier of a service to which the service flow belongs;
sending a first request message to an application function (AF) network element, wherein the first request message requests the service data and the first request message comprises the identifier of the service;
receiving, from the AF network element, service data that corresponds to the service flow and that is on the AF network element, wherein the service data comprises a first identifier;
sending a second request message to a third network element, wherein the second request message requests network data and the second request message comprises the identifier of the service;
receiving, from the third network element, the network data that corresponds to the service flow and that is on the third network element, the network data comprises a second identifier;
correlating, based on a mapping relationship between the first identifier and the second identifier, the service data and the network data to obtain training data of the service flow; and
performing, based on the training data, one of user-plane or control-plane fault diagnosis.

6. The NWDAF network element according to claim 5, wherein the service data further comprises at least one of: flow bit rate data of a first interface, latency data of the first interface, and packet loss rate data of the first interface, wherein the first interface is an interface between a user plane function (UPF) network element and a data network (DN) that corresponds to the AF network element.

7. The NWDAF network element according to claim 5, wherein the third network element is a UPF network element, the network data further comprises at least one of: flow bit rate data of a second interface, latency data of the second interface, and packet loss rate data of the second interface, wherein the second interface is an interface between the UPF network element and a radio access network RAN device.

8. The NWDAF network element according to claim 5, wherein the third network element is a RAN device, the network data further comprises at least one of: flow bit rate data of a fourth interface, latency data of the fourth interface, and packet loss rate data of the fourth interface, wherein the fourth interface is an interface between the RAN device and a terminal.

9. A system, comprising: a network data analytics function (NWDAF) network element and a second network element coupled with NWDAF network element, wherein the NWDAF network element, comprises:
a non-transitory memory storing instructions; and
at least one processor coupled to the non-transitory memory, wherein the at least one processor is configured to execute instructions stored in the memory, to cause the NWDAF network element to perform operations comprising:
receiving a message from a second network element, wherein the message instructs the NWDAF network element to obtain data corresponding to a service flow, the message comprises an identifier of a service to which the service flow belongs;
sending a first request message to an application function (AF) network element, wherein the first request message requests the service data and the first request message comprises the identifier of the service;

receiving, from the AF network element, service data that corresponds to the service flow and that is on the AF network element, wherein the service data comprises a first identifier;

sending a second request message to a third network element, wherein the second request message requests network data and the second request message comprises the identifier of the service;

receiving, from the third network element, the network data that corresponds to the service flow and that is on the third network element, the network data comprises a second identifier;

correlating, based on a mapping relationship between the first identifier and the second identifier, the service data and the network data to obtain training data of the service flow; and performing, based on the training data, one of user-plane or control-plane fault diagnosis.

10. The system according to claim 9, wherein the service data further comprises at least one of: flow bit rate data of a first interface, latency data of the first interface, and packet loss rate data of the first interface, wherein the first interface is an interface between a user plane function (UPF) network element and a data network (DN) that corresponds to the AF network element.

11. The system according to claim 9, wherein the third network element is a UPF network element, the network data further comprises at least one of: flow bit rate data of a second interface, latency data of the second interface, and packet loss rate data of the second interface, wherein the second interface is an interface between the UPF network element and a radio access network RAN device.

12. The system according to claim 9, wherein the third network element is a RAN device, the network data further comprises at least one of: flow bit rate data of a fourth interface, latency data of the fourth interface, and packet loss rate data of the fourth interface, wherein the fourth interface is an interface between the RAN device and a terminal.

* * * * *